US009187123B2

(12) United States Patent
Sutton et al.

(10) Patent No.: US 9,187,123 B2
(45) Date of Patent: *Nov. 17, 2015

(54) DUAL LANE MULTI-AXLE TRANSPORT VEHICLE

(71) Applicant: Alpha One Transporter Inc., Chino, CA (US)

(72) Inventors: Earl R. Sutton, Chino, CA (US); James R. McGhie, Henderson, NV (US)

(73) Assignee: Faymonville Distribution AG, Weiswampach (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,833

(22) Filed: Apr. 18, 2013

(65) Prior Publication Data
US 2013/0234413 A1 Sep. 12, 2013

Related U.S. Application Data

(63) Continuation of application No. 13/601,909, filed on Aug. 31, 2012, now Pat. No. 8,424,897, which is a continuation of application No. 12/459,578, filed on Jul. 3, 2009, now abandoned, which is a
(Continued)

(51) Int. Cl.
*B62D 13/00* (2006.01)
*B60G 3/06* (2006.01)
(Continued)

(52) U.S. Cl.
CPC *B62D 13/00* (2013.01); *B60G 3/06* (2013.01); *B60G 11/265* (2013.01);
(Continued)

(58) Field of Classification Search
CPC ........ B62D 13/00; B62D 53/00; B62D 61/10; B62D 63/068
USPC ............ 280/444, 404, 408, 676; 180/14.1, 22
See application file for complete search history.

(56) References Cited

U.S. PATENT DOCUMENTS 1,911,335 A 5/1933 Abbott
2,295,084 A 9/1942 Keehn
(Continued)

FOREIGN PATENT DOCUMENTS

GB 2007603 A 5/1979

OTHER PUBLICATIONS

Plaintiff's Opening Claim Construction Brief, United States District Court Southern District of California, Case No. 3:13-cv-02662-H-NLS; 3:13-cv-02663-H-NLS; 3:13-cv-02669-H-NLS, Document No. 77 filed Nov. 2, 2014.
(Continued)

*Primary Examiner* — Karen Beck
(74) *Attorney, Agent, or Firm* — Blakely, Sokoloff, Taylor & Zafman, LLP

(57) ABSTRACT

A dual lane, multi-axle transport vehicle for moving heavy loads includes a forward module mounted on a plurality of axles and a rearward module mounted on a plurality of axles. The forward module is mechanically connected to the rearward module for providing a dual lane transport body. The forward module and the rearward module of the transport body each have a single central spine wherein the axles of both the forward module and the rearward module are each attached to the corresponding single central spine. The axles of both the forward module and the rearward module have an axle spacing of at least six feet. A hydraulic suspension is provided for dynamically stabilizing the axles for reducing axle yaw. An axle steering system having a plurality of steering rods controls the position of the axles of both the forward module and the rearward module.

21 Claims, 21 Drawing Sheets

Related U.S. Application Data continuation-in-part of application No. 11/800,361, filed on May 5, 2007, now abandoned, which is a continuation-in-part of application No. 11/185,417, filed on Jul. 20, 2005, now Pat. No. 7,213,824, which is a continuation of application No. 10/443,550, filed on May 22, 2003, now Pat. No. 6,942,232.

(60) Provisional application No. 60/383,554, filed on May 24, 2002.

(51) Int. Cl.
  *B60G 11/26* (2006.01)
  *B62D 63/06* (2006.01)

(52) U.S. Cl.
  CPC ........... *B62D 13/005* (2013.01); *B62D 63/068* (2013.01); *B60G 2200/132* (2013.01); *B60G 2200/44* (2013.01); *B60G 2200/445* (2013.01); *B60G 2300/04* (2013.01); *B60G 2300/36* (2013.01)

(56) References Cited

U.S. PATENT DOCUMENTS

| | | | |
|---|---|---|---|
| 2,638,355 A | 5/1953 | Spangler | |
| 2,867,432 A | 1/1959 | Barker et al. | |
| 2,919,928 A | 1/1960 | Hoffer | |
| 3,147,715 A | 9/1964 | Myers | |
| 3,209,850 A | 10/1965 | Fish | |
| 3,254,901 A | 6/1966 | Fisher et al. | |
| 3,334,912 A | 8/1967 | Mauck | |
| 3,390,895 A | 7/1968 | Verdi | |
| 3,420,543 A | 1/1969 | Strifler et al. | |
| 3,447,813 A | 6/1969 | Wolf | |
| 3,454,123 A | 7/1969 | Lewis | |
| 3,479,050 A | 11/1969 | Bloise | |
| 3,582,104 A | 6/1971 | Eggert, Jr. | |
| 3,689,107 A | 9/1972 | Humes | |
| 3,712,641 A | 1/1973 | Sherman | |
| 3,734,538 A | 5/1973 | Humes | |
| 3,834,480 A | 9/1974 | McGee | |
| 3,953,040 A | 4/1976 | Unruh et al. | |
| 4,053,170 A | 10/1977 | Hyler et al. | |
| 4,053,171 A | 10/1977 | Hyler | |
| 4,212,483 A | 7/1980 | Howard | |
| 4,341,494 A | 7/1982 | Fedele | |
| 4,350,190 A | 9/1982 | McColl | |
| 4,372,407 A | 2/1983 | McColl | |
| 4,441,730 A | 4/1984 | Damm | |
| 4,452,555 A | 6/1984 | Calabro | |
| 4,468,047 A | 8/1984 | McGhie et al. | |
| 4,752,080 A | 6/1988 | Rogers | |
| 4,759,563 A | 7/1988 | Nash | |
| 4,943,078 A * | 7/1990 | McGhie et al. | 280/408 |
| 4,982,976 A | 1/1991 | Kramer | |
| 5,005,851 A * | 4/1991 | McGhie et al. | 280/407.1 |
| 5,029,885 A | 7/1991 | Steiner | |
| 5,112,073 A | 5/1992 | McGhie et al. | |
| 5,201,836 A | 4/1993 | DeWitt | |
| 5,207,443 A | 5/1993 | Mitchell | |
| 5,364,116 A | 11/1994 | Houle et al. | |
| 5,477,937 A | 12/1995 | Chagnon | |
| 5,997,013 A | 12/1999 | Claxton | |
| 6,012,724 A | 1/2000 | Pitkanen | |
| 6,135,484 A | 10/2000 | Lauronen et al. | |
| 6,170,848 B1 | 1/2001 | Wechner | |
| 6,193,257 B1 | 2/2001 | Lutz | |
| 6,308,976 B1 | 10/2001 | Mitchell | |
| 6,371,505 B1 * | 4/2002 | Turner, II | 280/441.2 |
| 6,796,572 B1 | 9/2004 | McGhie | |
| 6,877,581 B2 | 4/2005 | Badr et al. | |
| 6,883,821 B2 | 4/2005 | Gunderson | |
| 6,942,232 B1 * | 9/2005 | McGhie | 280/124.112 |
| 6,966,502 B2 | 11/2005 | Wilt | |
| 7,017,925 B2 * | 3/2006 | Lindsay | 280/124.1 |
| 7,086,660 B2 | 8/2006 | Bruening et al. | |
| 7,134,829 B2 | 11/2006 | Quenzi et al. | |
| 7,159,888 B1 * | 1/2007 | Sutton et al. | 280/411.1 |
| 7,213,824 B1 | 5/2007 | McGhie | |
| 7,216,896 B1 * | 5/2007 | McGhie et al. | 280/789 |
| 7,571,916 B2 | 8/2009 | Skiles | |
| 7,637,512 B1 * | 12/2009 | McGhie et al. | 280/93.504 |
| 7,726,423 B2 | 6/2010 | Atley | |
| 8,424,897 B1 * | 4/2013 | Sutton et al. | 280/444 |
| 2002/0180178 A1 | 12/2002 | Masters et al. | |
| 2004/0052616 A1 * | 3/2004 | Stanley | 414/10 |
| 2004/0104555 A1 | 6/2004 | Atley | |
| 2005/0062241 A1 * | 3/2005 | Lindsay | 280/30 |
| 2007/0029755 A1 | 2/2007 | Lagace et al. | |
| 2009/0236823 A1 | 9/2009 | Prem et al. | |
| 2009/0273159 A1 * | 11/2009 | Sutton | 280/419 |

OTHER PUBLICATIONS

Second Amended Complaint for Patent Infringement, United States District Court Southern District of California, Case No. 3:13-cv-02669-H-DHB, Document No. 23 filed Sep. 30, 2014.
Second Amended Complaint for Patent Infringement, United States District Court Southern District of California, Case No. 3:13-cv-02663-H-DHB, Document No. 34 filed Sep. 30, 2014.
First Amended Complaint for Patent Infringement, United States District Court Southern District of California, Case No. 3:13-cv-02662-H-DHB, Document No. 68 filed on Sep. 30, 2014.
United States District Court, Southern District of California, Order: 1) Consolidating Cases for Pretrial Purposes, 2) Granting Motion to Substitute Attorney, 3) Granting Parties' Joint Motion for Extension of Time, and 4) Setting a Case Management Conference, Case No. 3:13-cv-02662-H-NLS; 3:13-cv-02663-H-NLS; 3:13-cv-02669-H-NLS, Document No. 11 filed on Feb. 2, 2014.
JXS Catalog for Jakes Crane, Rigging & Transport International, 6109 Industrial Rd., Las Vegas, Nevada 89118, Miscellaneous pages, photos and charts.
Talbert Transporter Catalog, Special Products, R.R. 5, P.O. Box 195, Rensselaer, In 47978, 1-800-348-5232, Miscellaneous pages & photos.
Goldhofer Trailers, Goldhofer THP Trailers Catalog, 502 Park Ave., New York, NY 10022, 1-212-826-0700, Misc. pages from p. 1-31 & photos.
Nicolas Trailers, Nicolas Hydraulic Trailer Catalog, 89290 Camps Sur Yonne, France, Miscellaneous pages and photos.
Scheuerle Fahrzeugfabrik GmbH, Postfach/P.O. Box 20, D-74627 Pfedelbach, pages from Technical Catalog, Jun. 2007, 21 pages, schematics, loading diagrams, technical description, specification, trailer components, accessories, commercial terms.
Scheuerle Fahrzeugfabrik GmbH, Postfach/P.O. Box 20, D-74627 Pfedelbach, Super Vario 2000, one sheet, two views, Drawing Fig. 092354, side elevation view and top plan view drawing showing a single lane transport vehicle exhibiting close coupling design, dr.
Non-Final Office Action (dated Nov. 29, 2011), U.S. Appl. No. 12/459,578, filed Jul. 3, 2009, First Named Inventor: Earl R. Sutton, 16 pages.
Final Office Action (dated Jul. 23, 2012), U.S. Appl. No. 12/459,578, filed Jul. 3, 2009, First Named Inventor: Earl R. Sutton, 8 pages.
"Flexible Muscle, Heavy Trailer Delivers the Goods", Lifting & Transportation International, Apr. 1989 issue, Wash. D.C. 20013, pp. 62-63.

* cited by examiner

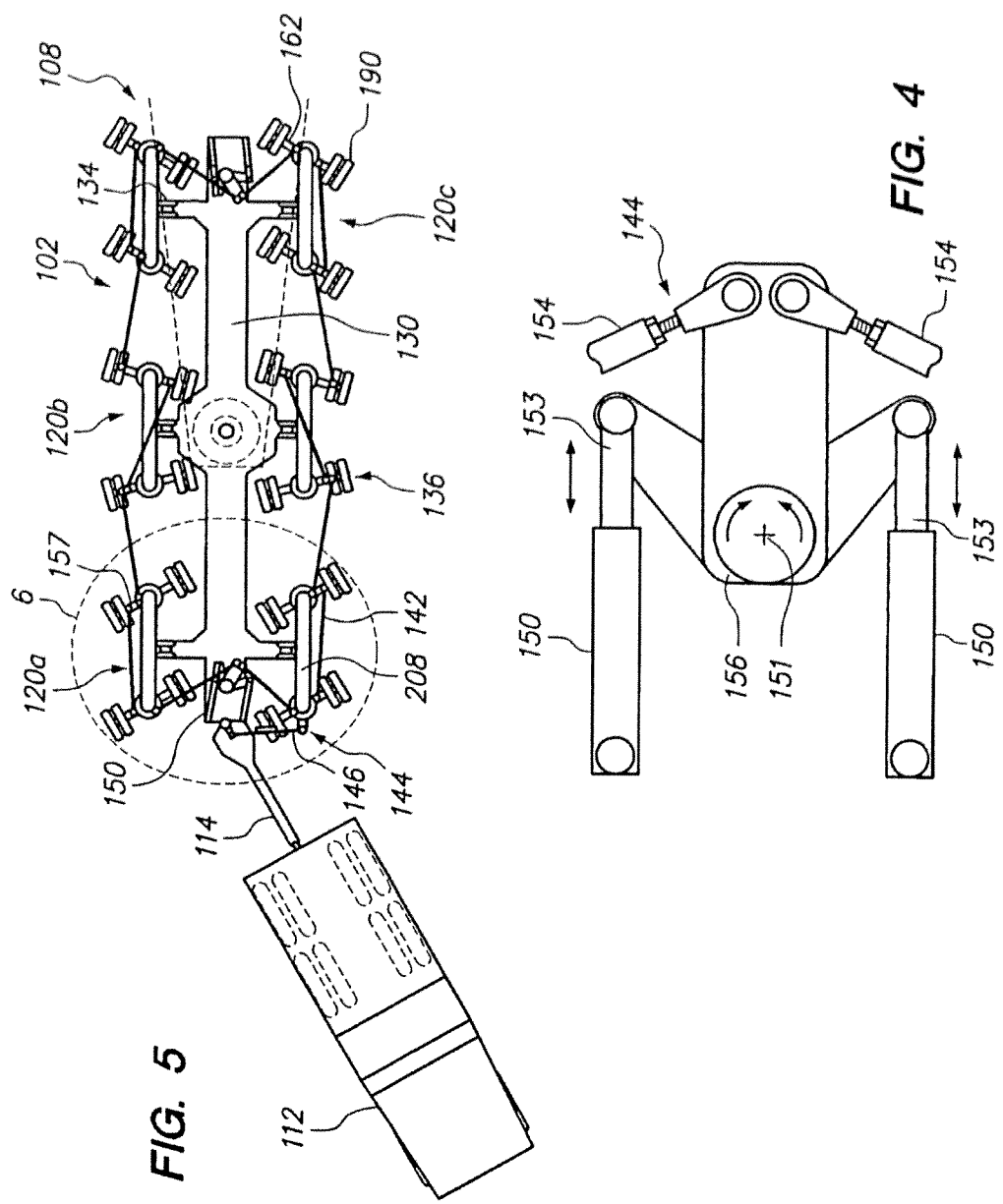

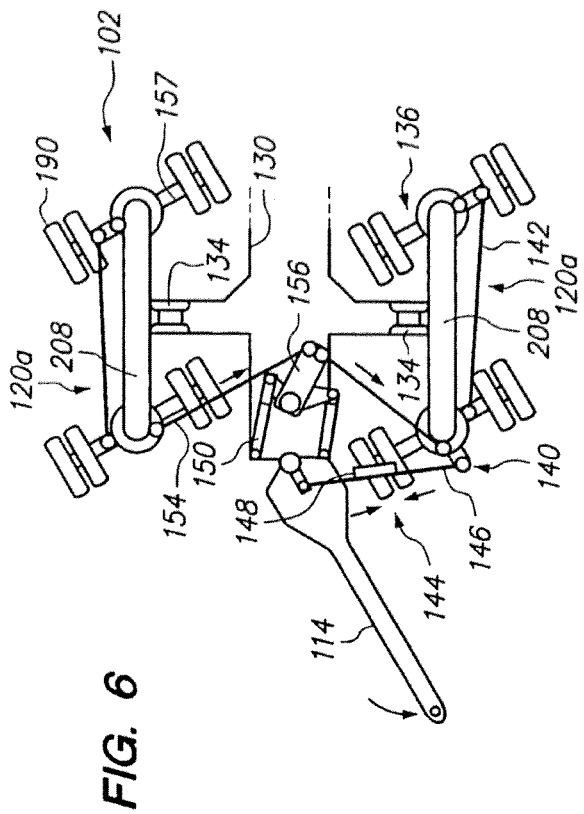
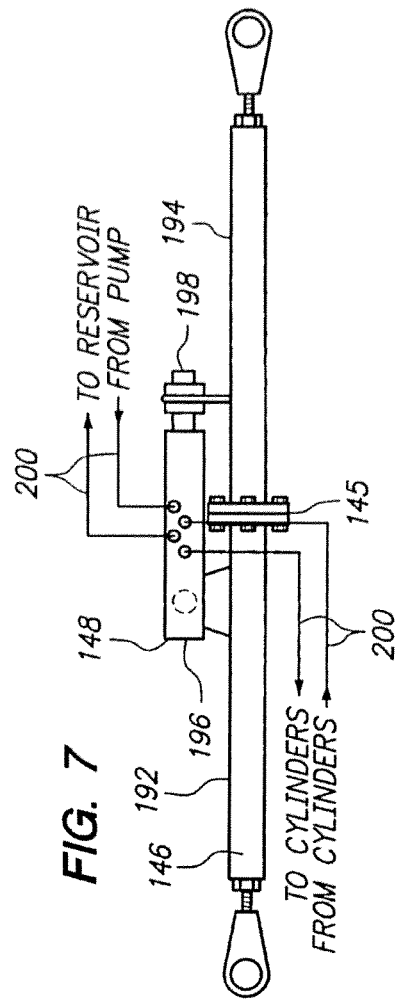
FIG. 6
FIG. 7

DUAL LANE MULTI-AXLE TRANSPORT VEHICLE

CROSS REFERENCE TO RELATED APPLICATIONS

This patent application is a continuation of patent application having Ser. No. 13/601,909 filed Aug. 31, 2012 (which will issue as U.S. Pat. No. 8,424,897 on Apr. 23, 2013), which is in turn a continuation of Ser. No. 12/459,578 filed Jul. 3, 2009, now abandoned, which is in turn a continuation-in-part application of Ser. No. 11/800,361 filed May 5, 2007, now abandoned, which is in turn a continuation-in-part application of Ser. No. 11/185,417 filed Jul. 20, 2005, now U.S. Pat. No. 7,213,824, which is in turn a continuation of Ser. No. 10/443,550 filed May 22, 2003, now U.S. Pat. No. 6,942,232, which in turn claims the filing benefit under 35 U.S.C. Section 119(e) of U.S. Provisional Patent Application No. 60/383,554 filed May 24, 2002, each of which is incorporated herein by reference.

BACKGROUND OF THE INVENTION

1. Technical Field

The present invention pertains generally to multi-axle transport vehicles for moving heavy loads, and more particularly to a dual lane multi-axle transport vehicle.

2. Background Art

Heavy hauling vehicles for moving transformers, cranes, boats, industrial equipment, and other heavy objects are well known in the art. An example of such a vehicle is disclosed in U.S. Pat. No. 4,943,078 which discloses a heavy load hauler for traveling on conventional roadways for moving heavy construction equipment such as cranes or the like from one work site to another. The hauler includes a front tractor drawn carriage, a rear carriage, and a load unit disposed between and carried by the carriages. The front carriage is supported upon a multiplicity of independent wheel and axle units. There is a first fifth wheel coupling at the leading end of the front carriage for connecting to the fifth wheel coupling of a tractor. A second fifth wheel coupling is spaced rearwardly on the front carriage.

The load carrying rear carriage is also supported upon a multiplicity of independent wheel and axle units. There is a fifth wheel coupling intermediate the leading and trailing ends of the rear carriage. The load unit has forwardly and rearwardly projecting goosenecks. Each gooseneck has a fifth wheel coupling. The fifth wheel coupling located on the forwardly projecting gooseneck connects to the fifth wheel coupling on the front carriage. The fifth wheel coupling located on the rearwardly projecting gooseneck connects to the fifth wheel coupling on the rear carriage. The load unit may be either the crane itself or a flatbed upon which the crane is carried. At least some of the independent wheel and axle units are steerably mounted on their carriages. Each wheel and axle unit has its wheels supported by a hydraulic suspension. Hydraulic circuitry interconnects all of the suspensions so as to equally distribute the load among all of the wheel units. Steering of the independent wheel and axle units is interphased for the front and rear carriages by a pair of operatively associated interrelated in-line valve cylinder units. FIG. 12A of U.S. Pat. No. 4,943,078 shows a valve 718 used in a power steering system which is coupled to a connecting link 703.

Other heavy hauling vehicles are sold by Goldhofer Fahrzeugwerk G.m.b.H. of Memmingen, Germany; Nicolas of Champs Sur Yonne, France; and Talbert of Rensselaer, Ind. Further, heavy hauling services utilizing heavy hauling vehicles are shown in advertising by Jake's Crane, Rigging & Transport International of Las Vegas, Nev. Traditionally, these heavy haul transport vehicles of the prior art occupy two lanes of the highway and move at very slow speeds such as five miles per hour because of limitations in the equipment. Many of the traditional wide axle heavy transport vehicle systems of the prior art are difficult to control and are virtually impossible to move in the reverse direction. These traditional heavy transport vehicle systems require many manual steering adjustments during travel that are both difficult to complete and inefficient. Any necessary turns other than minor turns may require the stopping of the transport vehicle and manually turning the wheel axles. Further, variations in the road surface such as dips, holes, and slants may break equipment if higher speeds are attempted.

While these traditional heavy transport vehicle systems are designed to meet the requirements of the Vehicle and Transportation Codes of many states regarding axle spacing, in general, they have not had either an automatic steering system or the ability to travel at high speeds. The heavy transport vehicle systems disclosed by the prior art that currently do have automatic steering have neither the overall width nor the axle spacing required for optimum heavy transport in many states such as the State of California. In some traditional heavy transport vehicle systems, the movement of a front tow bar causes a corresponding movement in the front wheels of the front dolly about a pivot. However, the rear wheels of the dollies do not steer. The rear dollies are not connected to the steering of the front dolly and must be steered manually by pushing or pulling on the steering arm link as the vehicle moves slowly forward. Finally, these traditional heavy transport vehicle systems must be completely disassembled for transport between job locations.

Improved systems having a plurality of modules joined by a mechanically connected, load bearing means that form a dual lane transport body, including a single central spine extending through the modules, and having an automatic power steering system for controlling the steering angle of a plurality of axles, an axle steering system for providing all axle steering at any speed, and a suspension system that responds rapidly to the varying road conditions imposed by higher speeds would greatly reduce the time and effort to transport a payload.

DISCLOSURE OF THE INVENTION

The present invention is directed to a dual lane multi-axle transport vehicle for moving heavy loads. The transport vehicle is employed to transport extremely heavy loads such as large industrial equipment "on-road" over highways typically during non-peak travel times. The inventive transport vehicle occupies two adjacent highway lanes when traveling and typically includes at least a pair of transport modules that are mechanically connected by a load bearing means for providing a high speed, dual lane transport body. The transport vehicle is capable of carrying a payload on both the load bearing means and on each of the transport modules. Further, the transport vehicle is capable of speeds up to 35 miles per hour when carrying a full payload. Such speeds improve the utility of the transport vehicle.

In accordance with a preferred embodiment of the invention, the dual lane, multi-axle transport vehicle of the present invention includes a forward module pulled by a forward prime mover with a draw bar and a rearward module pushed by a pair of rearward prime movers with driver push rods. The forward module is mounted on a plurality of axles while the rearward module is also mounted on a plurality of axles, each to enable movement of the respective module. In accordance with the preferred embodiment of the present invention, the axles are arranged or configured as dollies in sets of two, that is, two axles per dolly. However, it should be understood that the present invention is not intended to be limited to this axle configuration. The forward module is mechanically connected to the rearward module to provide the high speed, dual lane transport body. In a preferred embodiment, the means for connecting the forward module to the rearward module is a transport frame having a pair of transport carrying beams associated therewith. The transport frame comprised of the pair of transport carrying beams is utilized to carry the payload from a starting location to a destination.

The forward module and the rearward module of the high speed, dual lane transport body each include a single central spine. Consequently, the transport vehicle includes a single central spine of the forward module and a separate single central spine of the rearward module, each functioning as a backbone of the respective module of the transport vehicle. Each of the forward dollies associated with the forward module can be removably attached to the single central spine of the forward module. Likewise, each of the rearward dollies associated with the rearward module can also be removably attached to the single central spine of the rearward module. The axles associated with the forward dollies and the axles associated with the rearward dollies can be removably connected to the respective single central spine of the forward module and the rearward module by a connector to facilitate ready disassembly. The width of the transport vehicle can be modified by utilizing connectors of varying widths to accommodate road conditions and/or government regulations.

Furthermore, both the forward dollies and the rearward dollies each include a plurality of axles wherein the axle spacing between parallel axles of the same dolly is at least six feet, and more particularly nine feet to carry the maximum load permitted by the state highway transportation regulatory agency. In particular, in the State of California, the state highway transportation regulatory agency is known as the California Department of Transportation or CalTrans. A hydraulic suspension system is also employed for dynamically stabilizing the transport vehicle. Finally, an axle steering system is included that comprises a plurality of steering rods for controlling the position of the axles of the forward dollies and the rearward dollies during movement of the transport vehicle.

The multi-axle transport vehicle further includes an automatic power steering system positioned within the forward module for steering the forward module of the transport vehicle. The automatic power steering system includes a variable length strut which cooperates with a power steering valve that functions as a hydraulic control unit. The length of the variable length strut changes as a function of the draw bar position. This length variation is mechanically coupled to the power steering valve which, in turn, controls the hydraulics of the automatic power steering system and also the position of a pair of front hydraulic cylinders and a pair of rear hydraulic cylinders of the forward module. The front hydraulic cylinders control the position of a pair of forward V-shaped steering rods via a forward steering crank. The forward V-shaped steering rods function to control the position of the front axles of the forward module. The rear hydraulic cylinders control the position of a pair of rearward V-shaped steering rods via a rearward steering crank. The rearward V-shaped steering rods function to control the position of the rear axles of the forward module which are always opposite to the position of the front axles of the forward module during a turning maneuver. The axle steering rods of the axle steering system then cooperate with the forward V-shaped steering rods for controlling the position of the remaining axles of the forward module. The axles of the rearward module are controlled in a similar manner by an operator controlled steering wheel located in a steering cab. Mechanical steering of the transport vehicle continues to be permitted even in the event of failure of the automatic power steering system without placing mechanical stress upon the power steering valve.

The hydraulic suspension system of the transport vehicle serves to dynamically stabilize the axles of the dual lane transport body and tends to resist axle yaw. The suspension system for the multi-axle transport vehicle is utilized to move heavy loads and includes two fluid activated cylinders and two spaced apart arms for each wheel and axle set. The hydraulic suspension system thus enables the transport vehicle to be raised and lowered with respect to the roadway. The suspension system mechanically stabilizes the axles with respect to the transport vehicle thereby reducing axle yaw. Axle yaw is typically characterized by the intermittent vibration of the respective wheel and axle set typically caused by the deterioration of the road surface. Consequently, reducing axle yaw facilitates higher transport speeds.

The structure of the suspension system is connected to the axle of each wheel and axle set by an axle linkage member which is connected to the two spaced-apart arms at four different pivotal or attachment locations. This four-point connection stabilizes the axle linkage member and substantially reduces any tendency of the axle to yaw when exposed to road induced forces. It is important to note that the suspension system employs the two fluid activated cylinders rather than the conventional single cylinder. This feature allows the use of smaller diameter fluid activated cylinders for a given system pressure. The cylinders are mounted on the outside of the suspension system for ease of maintenance. In accordance with an aspect of the invention, when the transport vehicle is traveling on a roadway, the connection of a first attachment station to a third attachment station, the connection of a second attachment station to a fourth attachment station, and the connection of the two fluid activated cylinders between the structure of the suspension system and the axle linkage member combine to reduce yaw of the axle.

The present invention is generally directed to a dual lane, multi-axle transport vehicle for use in moving heavy loads including a forward module mounted on a plurality of axles and a rearward module mounted on a plurality of axles. The forward module is mechanically connected to the rearward module for providing a dual lane transport body. The forward module and the rearward module of the transport body each have a single central spine wherein each of the axles of the forward module and each of the axles of the rearward module are respectively attached to the corresponding single central spine. The axles of the forward module and the axles of the rearward module have an axle spacing of at least six feet. A hydraulic suspension is provided for dynamically stabilizing the axles for reducing axle yaw. An axle steering system having a plurality of steering rods controls the position of the axles of the forward module and the axles of the rearward module.

An additional aspect of the dual lane, multi-axle transport vehicle for moving heavy loads of the present invention includes a self-steering caster suspension system. The caster suspension system is utilized for moving ultra heavy loads and also includes the two fluid activated cylinders and the two spaced apart arms for each wheel and axle set of each dolly. The caster suspension system allows the transport vehicle to be raised and lowered with respect to the roadway. The caster suspension system also mechanically stabilizes the axles with respect to the transport vehicle thereby reducing the axle yaw and allowing for higher transport speeds. As the transport vehicle moves, the suspension system casters into alignment with the direction of travel of the transport vehicle. The caster suspension system includes a structure pivotable about a first axis where the structure has a first attachment station spaced apart from a second attachment station. An axle is disposed along a second axis perpendicular to the first axis. The second axis is spaced from the first axis by an amount sufficient to cause the axle and the second axis to caster about the first axis and move into alignment with the direction of travel of the transport vehicle when the transport vehicle is moved. An axle linkage member has a third attachment station spaced apart from a fourth attachment station. The third attachment station of the axle linkage member is pivotally connected to the first attachment station of the structure. The fourth attachment station of the axle linkage member is pivotally connected to the second attachment station of the structure. The axle linkage member is pivotable about a third axis which is parallel to the second axis. Finally, the axle is pivotally connected to the axle linkage member, and the axle is pivotable about a fourth axis perpendicular to the first, second and third axes.

These and other objects and advantages of the present invention will become apparent from the following more detailed description, taken in conjunction with the accompanying drawings which illustrate, by way of example, the principles of the invention.

BRIEF DESCRIPTION OF THE DRAWINGS

FIG. 4 is an enlarged view of circled area 4 of FIG. 3 of the transport vehicle of FIG. 1 showing the hydraulic system that controls the steering of the forward module.

FIG. 5 is a top plan view of the forward prime mover and the forward module of the transport vehicle of FIG. 1 turning in the left direction and showing the positions of a plurality of steering rods.

FIG. 6 is an enlarged view of circled area 6 of FIG. 5 of the transport vehicle of FIG. 1 showing the position of steering rods and dollies of the forward module during a left turn.

FIG. 7 is an enlarged view of a power steering valve positioned across a variable length strut utilized for steering the transport vehicle in accordance with the present invention.

DETAILED DESCRIPTION OF THE INVENTION

Figure 1:
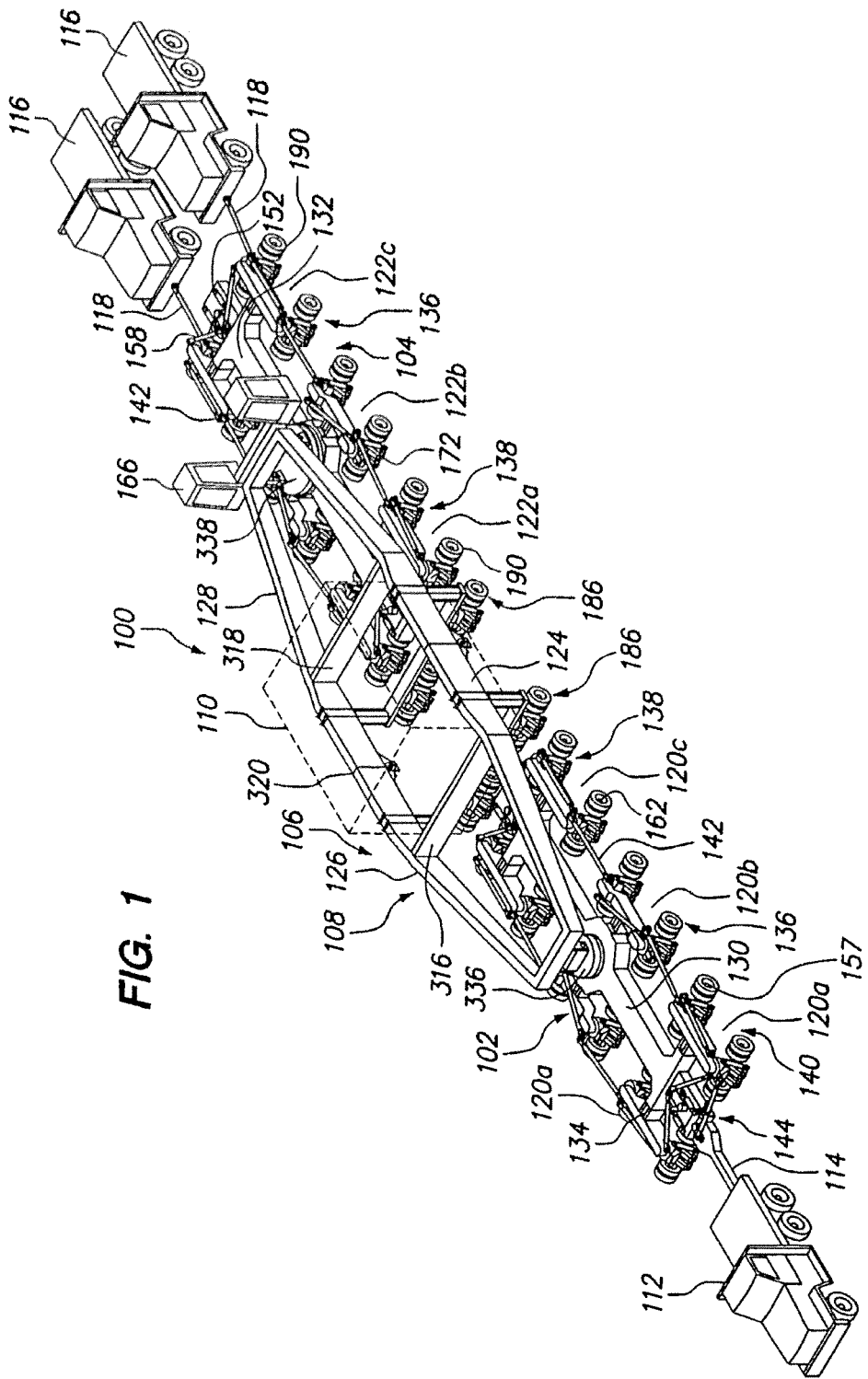
FIG. 1 is a left side perspective view of a dual lane, multi-axle transport vehicle of the present invention showing forward and rearward prime movers, forward and rearward modules and a transport frame positioned there between for transporting heavy loads.

The present invention is directed to a dual lane multi-axle transport vehicle 100 for moving heavy loads such as large industrial equipment weighing hundreds of thousands of pounds. The heavy loads are moved "on-road" over public highways typically during non-peak travel times and often with a police escort. The inventive multi-axle transport vehicle 100 occupies two adjacent highway lanes during the moving operation and typically includes at least a pair of transport modules including a forward module 102 and a rearward module 104 that are mechanically connected by a load bearing means 106 for providing a unitary constructed, high speed, dual lane transport body 108. The transport vehicle 100 is capable of carrying a payload 110 on both the load bearing means 106 and on each of the transport modules 102 and 104 as shown in FIG. 1. Further, the transport vehicle 100 is capable of highway speeds of thirty-five miles per hour when carrying the payload 110.

The following paragraphs set out an overview of the dual lane, multi-axle transport vehicle 100 as shown in FIG. 1. Subsequent paragraphs disclose the individual subsystems shown in FIGS. 2-38 of the present invention in greater detail. Some general definitions of terms as used in this disclosure include the following. The term "off-road" refers to a transport vehicle of the prior art that is not operated on highways and in which the total vehicle weight limit is not regulated by the state. The weight limit is determined by the physical capability of the "off road" vehicle. The term "on-road" indicates that the transport vehicle is authorized to travel on highways and over bridges of the state and that the weight limit is regulated. The weight limit is typically determined by the number and spacing of the axles of the transport vehicle. The term "high speed" as used herein means that the transport vehicle is capable of traveling speeds of 35 miles per hour when carrying a full payload 110 (and capable of traveling at even higher speeds when not carrying the payload 110). The term "dual lane" vehicle is defined as a transport vehicle that exhibits a width sufficient to occupy two adjacent highway lanes, wherein the transport vehicle is typically within the range of 18'-to-20'. The term "multi-axle" vehicle refers to a vehicle having multiple parallel rows of axles. In the present embodiment, the axle spacing between parallel axles is 9' 0", and the overall length of each axle from the outer wheel on one end of the axle to the outer wheel on the opposite end of the same axle is 7' 0". It is further noted that the term "light-weight" as it relates to the transport vehicle 100 is intended to convey that the components are generally designed to reduce the overall weight of the transport vehicle. This objective is accomplished by (1) using less steel construction material in the fabrication process by eliminating the box frame structure used in the prior art, and (2) ensuring that most structural components of the transport vehicle 100 are, in general, fabricated from a lighter weight material than is typically used by transport fabricators of the prior art.

Figure 8:
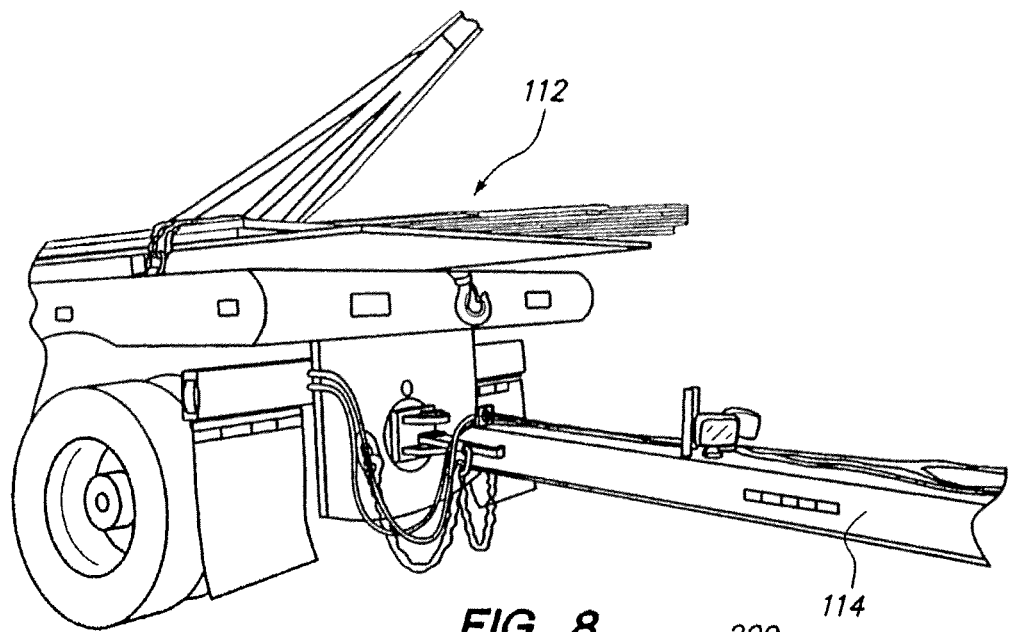
FIG. 8 is a perspective view of the forward prime mover showing a draw bar utilized to tow the transport vehicle shown in FIG. 1 of the present invention.

In accordance with a preferred embodiment of the present invention as illustrated in FIG. 1, the forward module 102 of the dual lane, multi-axle transport vehicle 100 is pulled by a forward prime mover 112 via a draw bar 114 (see FIG. 8). Likewise, the rearward module 104 is pushed by a pair of rearward prime movers 116 by utilizing a pair of driver push rods 118 (see FIG. 35). The forward module 102 is mounted on a plurality of axles 136 while the rearward module 104 is also mounted on a plurality of axles 136. In accordance with the preferred embodiment of the present invention, the axles 136 are arranged or configured in sets of two as forward dollies 120 and rearward dollies 122. That is, there are two axles 136 per forward dolly 120 and there are two axles 136 per rearward dolly 122. In effect, in the preferred embodiment, each of the forward dollies 120 is comprised of two axles 136 and each of the rearward dollies 122 is comprised of two axles 136 as shown in FIG. 1. However, it should be understood that the present invention is not intended to be limited to any particular axle configuration. Each of the forward dollies 120 and the rearward dollies 122 enable the movement of the forward module 102 and the rearward module 104, respectively, as is clearly shown in FIG. 1.

The forward module 102 is mechanically connected to the rearward module 104 to provide unitary construction to the high speed, dual lane transport body 108. In the preferred embodiment, the mechanical means for connecting the forward module 102 to the rearward module 104 is a transport frame 124 (see FIG. 1) having a pair of transport carrying beams 126 associated therewith (see FIGS. 30, 31 and 32). The transport frame 124 comprised of the pair of transport carrying beams 126 is employed to carry the payload 110 from a starting location to a destination, such as from one work site to another. It is noted that the load carrying means 106 can include transport components other than the transport frame 124 utilized in the unitary constructed, dual lane transport body 108 of the present invention. For example, the load carrying means 106 could include a flat bed section (not shown) in combination with a connection means such as a conventional gooseneck apparatus (not shown) employed to carry the payload 110.

Figure 36:
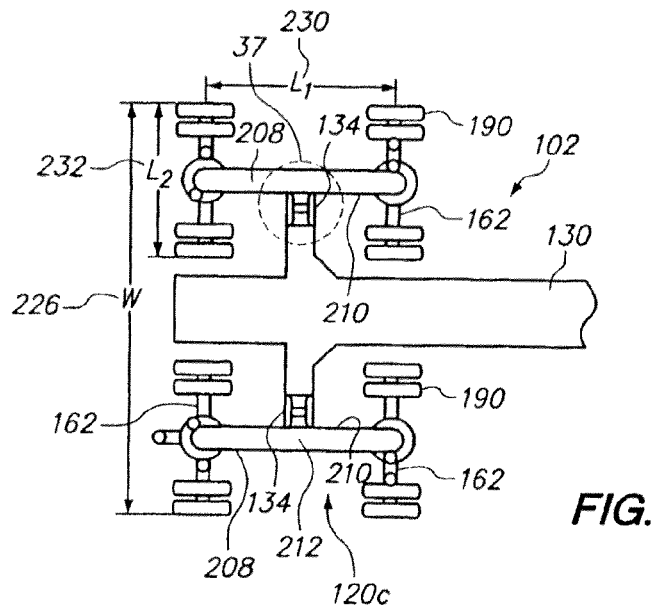
FIG. 36 is a simplified fragmented top plan view of a set of dollies removably attached with connectors to one of the single central spines of the transport vehicle of FIG. 1.

One of the novel features of the present invention is that the forward module 102 and the rearward module 104 of the high speed, dual lane transport body 108 shown in FIG. 1 each include a single central spine. Consequently, the multi-axle transport vehicle 100 includes a first single central spine 130 of the forward module 102 and a second single central spine 132 of the rearward module 104. Each of the first single central spine 130 and the second single central spine 132 function as a backbone of the respective module of the transport vehicle 100. Additionally, each of the forward dollies 120 associated with the forward module 102 can be removably attached to the first single central spine 130 of the forward module 102. Likewise, each of the rearward dollies 122 associated with the rearward module 104 can also be removably attached to the and single central spine 132 of the rearward module 104. In particular, the axles 136 of the forward dollies 120 and the axles 136 of the rearward dollies 122 can be removably connected to the respective single central spines, specifically, the first single central spine 130 of the forward module 102 and the second single central spine 132 of the rearward module 104, by a connector 134. This connector 134 facilitates ready disassembly of the particular dolly from the respective single central spine as shown in FIG. 36. The overall width of the multi-axle transport vehicle 100 can be modified by using connectors 134 of varying widths (see FIG. 37) to accommodate road conditions and/or government regulations.

Figure 2:
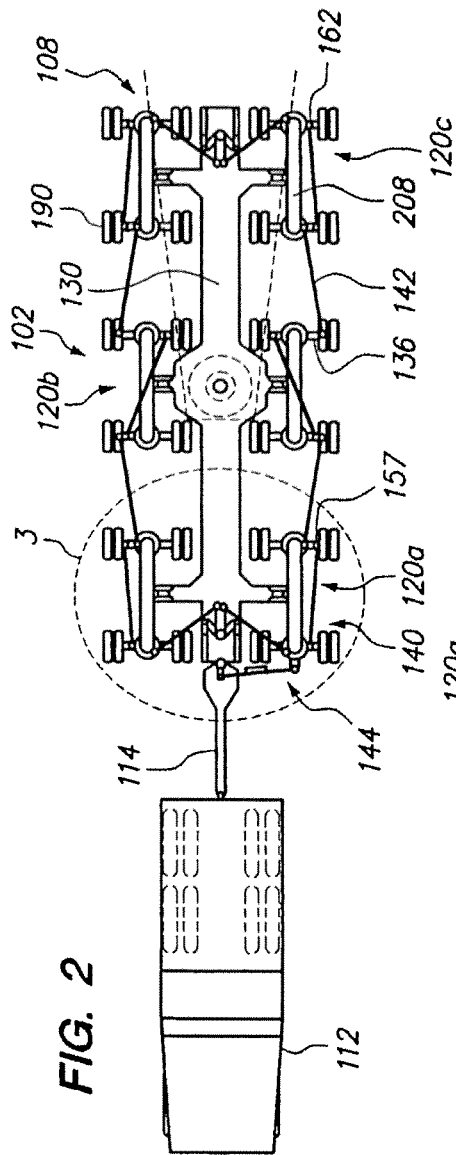
FIG. 2 is a top plan view of the forward prime mover and the forward module of the transport vehicle of FIG. 1 showing the forward dollies removably attached to the single central spine of said forward module and a system for steering.

Furthermore, both the forward dollies 120 and the rearward dollies 122 are each comprised of the plurality of axles 136 (see FIGS. 2, 10 and 17) wherein the axle spacing between parallel axles of the same dolly is at least six feet, and more particularly nine feet to carry the maximum weight load on the highway surface permitted by the state highway transportation regulatory agency. In the State of California, the state highway transportation regulatory agency is the California Department of Transportation or "CalTrans". A hydraulic suspension system 138 is also employed for dynamically stabilizing the transport vehicle 100 as shown in FIGS. 17-25. Additionally, an axle steering system 140 shown in FIGS. 2, 5 and 6 is included that comprises a plurality of axle steering rods 142 for controlling the position of the axles 136 comprising the forward dollies 120 and the rearward dollies 122 during movement of the transport vehicle 100.

Figure 33:
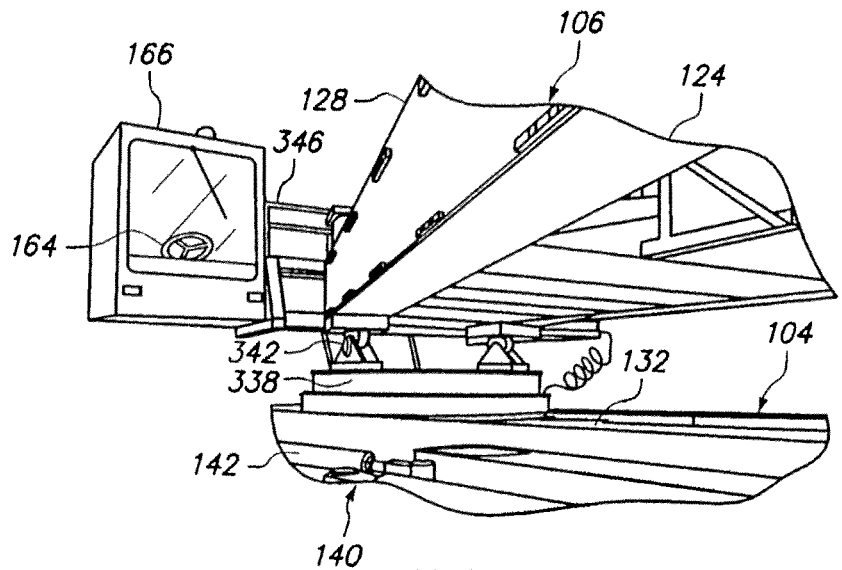
FIG. 33 is a perspective view of the rearward section of the transport frame of FIG. 1 showing a rearward main turn table mounted on the single central spine of the rearward module for point loading.

The multi-axle transport vehicle 100 further includes an automatic power steering system 144 positioned within the forward module 102 for steering the forward module 102 of the transport vehicle 100 as shown in FIGS. 3, 4, and 9-11. In general, the automatic power steering system 144 includes a variable length strut 146 which cooperates with a power steering valve 148 that functions as a hydraulic control unit. The length of the variable length strut 146 changes as a function of the position of the draw bar 114. This length variation is mechanically coupled to the power steering valve 148 which, in turn, controls the hydraulics of the automatic power steering system 144 and also the position of a pair of front hydraulic cylinders 150 and a pair of rear hydraulic cylinders 152 of the forward module 102. The front hydraulic cylinders 150 control the position of a pair of forward V-shaped steering rods 154 via a forward steering crank 156. The forward V-shaped steering rods 154 function to control the position of the front axles 157 (of the plurality of axles 136) of the forward module 102. The rear hydraulic cylinders 152 control the position of a pair of rearward V-shaped steering rods 158 via a rearward steering crank 160. The rearward V-shaped steering rods 158 function to control the position of the rear axles 162 (of the plurality of axles 136) of the forward module 102. It is noted that the rear axles 162 of the forward module 102 are always opposed to the position of the front axles 157 of the forward module 102 during a turning maneuver as shown in FIG. 5. The axle steering rods 142 of the axle steering system 140 then cooperate with the forward V-shaped steering rods 154 for controlling the position of the remaining axles 136 of the forward module 102. The axles 136 of the rearward module 104 are controlled in a similar manner by an operator controlled steering wheel 164 located in a steering cab 166 as shown in FIG. 33. Mechanical steering of the transport vehicle 100 continues to be permitted even in the event of failure of the automatic power steering system 144 without placing mechanical stress upon the power steering valve 148.

Figure 17:
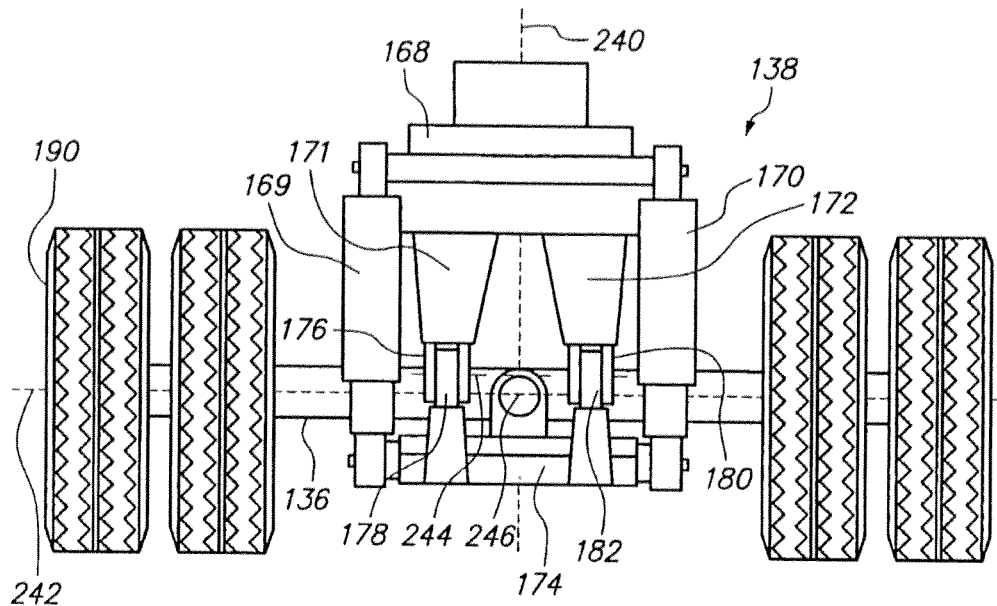
FIG. 17 is a front elevation view of a hydraulic axle suspension system of the transport vehicle of FIG. 1 in accordance with the present invention.

The hydraulic suspension system 138 of the multi-axle transport vehicle 100 serves to dynamically stabilize the axles 136 of conventional wheel sets of the high speed, dual lane transport body 108 and tends to resist axle yaw. The hydraulic suspension system 138 for the multi-axle transport vehicle 100 is utilized to move heavy loads and includes at least one fluid activated cylinder and a first spaced apart arm 171 and a second spaced apart arm 172 for each wheel and axle set of both the forward dollies 120 and the rearward dollies 122. In a preferred embodiment, there is a first fluid activated cylinder 169 and a second fluid activated cylinder 170. The first fluid activated cylinder 169 and the second fluid activated cylinder 170 are each spaced outboard of the first spaced apart arm 171 and the second spaced apart arm 172, respectively, as shown in FIG. 17. The hydraulic suspension system 138 thus enables the transport vehicle 100 to be raised and lowered with respect to the roadway. The suspension system 138 mechanically stabilizes the axles 136 with respect to the transport vehicle 100 thereby reducing axle yaw. Axle yaw is typically characterized by the intermittent vibration of the respective wheel and axle sets of a dolly typically caused by the deterioration of the road surface. Consequently, reducing axle yaw tends to facilitate higher speeds of the transport vehicle 100.

The structure 168 of the hydraulic suspension system 138 is connected to the axle 136 of each wheel and axle set of each of the forward dollies 120 and rearward dollies 122 by an axle linkage member 174. The axle linkage member 174 is connected to the first spaced apart arm 171 and the second spaced apart arm 172 at four different pivotal or attachment locations. This four point connection stabilizes the axle linkage member 174 and substantially reduces any tendency of the axle 136 to yaw when exposed to road induced forces. It is important to note that the suspension system 138 normally employs the first fluid activated cylinder 169 and the second fluid activated cylinder 170 rather than the conventional single fluid activated cylinder. This feature allows the use of smaller diameter fluid activated cylinders 169, 170 for a given pressure of the hydraulic suspension system 138. The first fluid activated cylinder 169 and the second fluid activated cylinder 170 are respectively mounted outboard of the first spaced apart arm 171 and the second spaced apart arm 172 as shown in FIG. 17 for ease of maintenance.

In accordance with an aspect of the invention, when the transport vehicle 100 is traveling on a roadway 248, (1) the connection of a first attachment station 176 to a third attachment station 178, (2) the connection of a second attachment station 180 to a fourth attachment station 182, and (3) the connection of the first fluid activated cylinder 169 and second fluid activated cylinder 170 between the structure 168 of the suspension system 138 and the axle linkage member 174, combine to reduce yaw of the axle 136. The use of the first spaced apart arm 171 with the second spaced apart arm 172 to form what is referred to as a "double knee" construction in combination with the first fluid activated cylinder 169 and the second fluid activated cylinder 170 is required when used with an axle 136 having a length of 7' 0" in order to maintain stability and minimize axle yaw.

Figure 27:
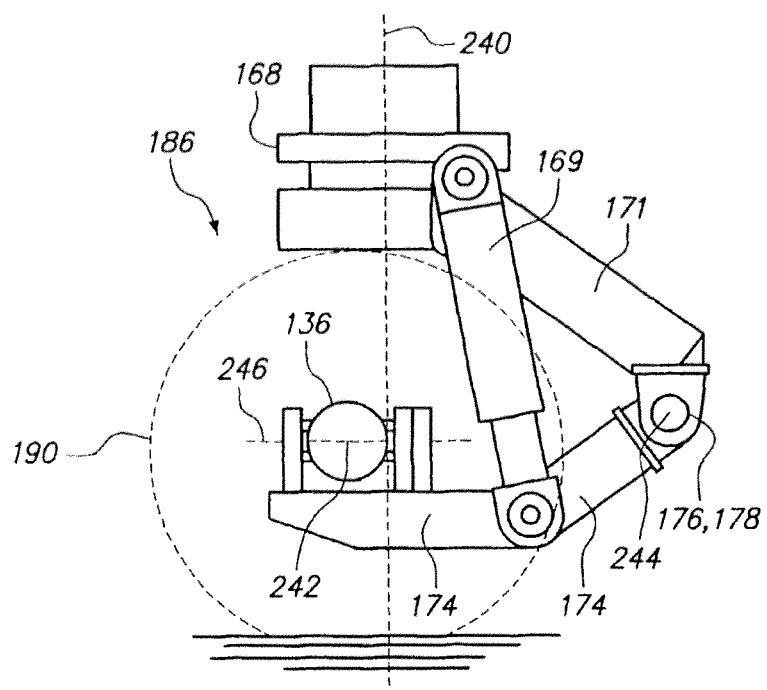
FIG. 27 is a side elevation view of a caster embodiment the hydraulic axle suspension system of FIG. 1.

An additional aspect of the dual lane, multi-axle transport vehicle 100 of the present invention for moving ultra heavy loads includes a self-steering caster suspension system 186 as shown in FIGS. 1 and 27. The self-steering caster suspension system 186 is utilized in conjunction with the hydraulic suspension system 38 when the payload 110 is extremely heavy. The self-steering caster suspension system 186 also includes the first fluid activated cylinder 169 and the second fluid activated cylinder 170, and the first spaced apart arm 171 and the second spaced apart arm 172, respectively, for each wheel and axle set of each forward dolly 120 and each rearward dolly 122 (as previously described for the suspension system 138 and shown in FIGS. 17-25). The first fluid activated cylinder 169 and second fluid activated cylinder 170, and the first spaced apart arm 171 and second spaced apart arm 172 also allow the transport vehicle 100 to be raised and lowered with respect to the roadway. The caster suspension system 186 also mechanically stabilizes the plurality of axles 136 with respect to the transport vehicle 100 thereby reducing the axle yaw and allowing for higher speeds of the transport vehicle 100. As the transport vehicle 100 moves, the self-steering caster suspension system 186 casters into alignment with the direction of travel of the transport vehicle 100.

A more detailed description of the subsystems of the dual lane, multi-axle transport vehicle 100 will now be presented making specific reference to the accompanying drawing FIGS. 1-38.

Figure 3:
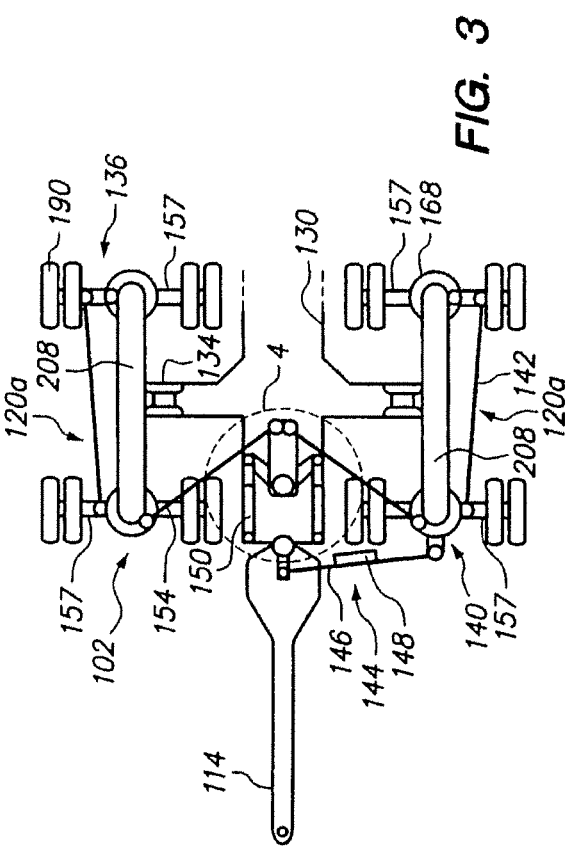
FIG. 3 is an enlarged view of circled area 3 of FIG. 2 of the transport vehicle of FIG. 1 showing a draw bar and the system for controlling the steering of the forward module.

The automatic power steering system 144 is employed to steer the multi-axle transport vehicle 100 of the present invention and particularly the forward module 102. The automatic power steering system 144 of the transport vehicle 100 is shown in FIGS. 2-11 and 15. A top plan view of the forward module 102 (also known as the front hauling carriage) is shown in FIG. 2 while FIG. 3 illustrates one of the forward dollies 120a within the forward module 102. FIG. 3 is an enlarged view of area 3 of FIG. 2. Note that the forward module 102 includes forward dollies 120a, 120b and 120c as shown in FIGS. 2 and 5. The automatic power steering system 144 includes the rotatable draw bar 114 which is connected to the forward prime mover 112 such as a towing vehicle (shown best in FIG. 8) and the forward dolly 120a shown in FIGS. 3, 9 and 10. Each of the forward dollies 120 of the forward module 102 comprises a front axle 157 of the plurality of axles 136 having a set of wheels 190 shown in FIGS. 3 and 10. In the embodiment shown, there are both right and left forward dollies 120 on opposite sides of the first single central spine 130 located in the forward module 102. The pair of forward hydraulic cylinders 150 of the forward module 102 shown in FIGS. 3, 4, 10 and 11 are mechanically connected by the forward steering crank 156 and the pair of forward V-shaped steering rods 154 to the forward dolly 120a. FIG. 4 is an enlarged view of area 4 of FIG. 3 showing the pair of front hydraulic cylinders 150, forward steering crank 156, and the pair of forward V-shaped steering rods 154. It is noted that the forward steering crank 156 pivots about a pivot point 151.

Figure 10:
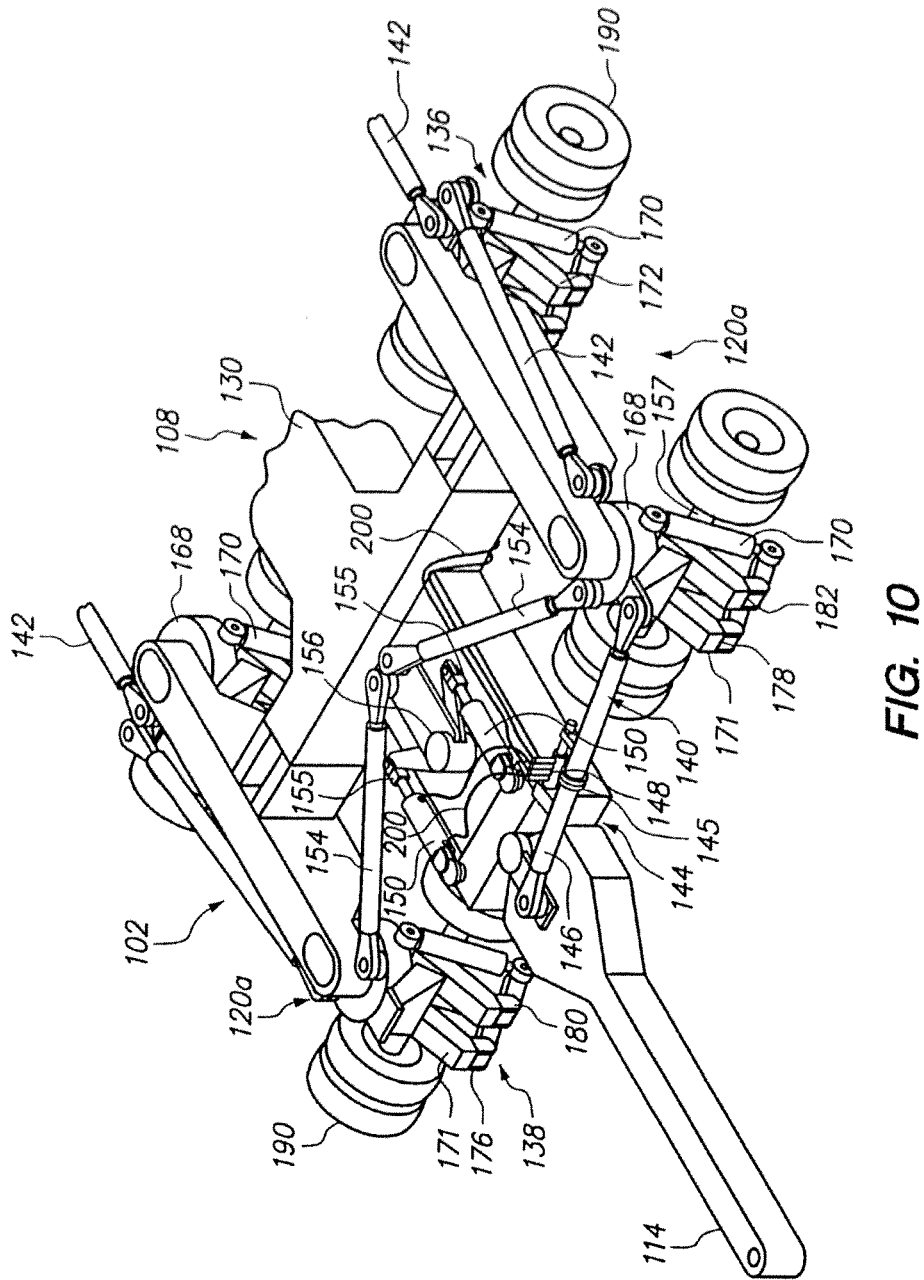
FIG. 10 is a fragmentary perspective view of the forward module of FIG. 1 showing the draw bar, the components of the automatic power steering unit and the single central spine of the forward module.
Figure 11:
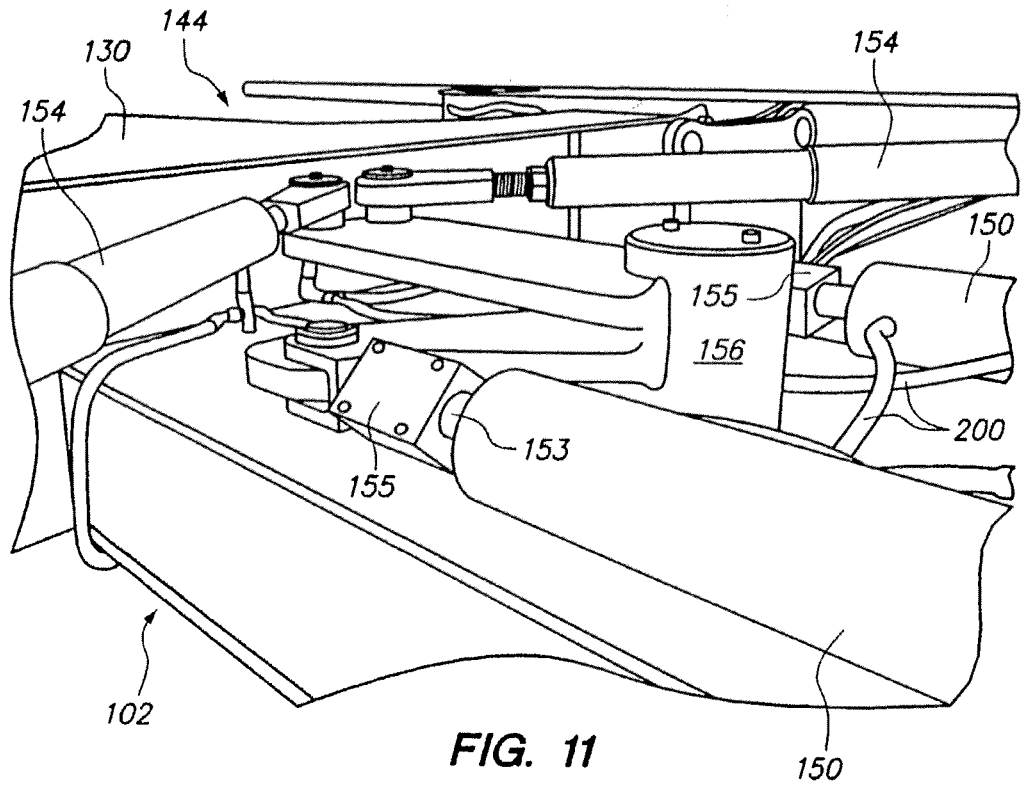
FIG. 11 is a perspective view showing the structure of the automatic power steering unit of the forward module of the transport vehicle of FIG. 1 including a pair of push-pull pistons and a pair of V-shaped steering rods.

The pair of front hydraulic cylinders 150 include corresponding piston rods 153 shown in FIG. 4 which are driven back and forth by hydraulic pressure exerted upon a piston (not shown). A pair of front limiting blocks 155 is provided with one front limiting block 155 mounted upon each of the piston rods 153 as shown in FIG. 11. The front limiting blocks 155 mounted on the piston rods 153 in forward dolly 120a cooperate with the corresponding front hydraulic cylinders 150 to limit the travel and turning radius of each set of wheels 190 of the forward module 102 to approximately 33-degrees as shown in FIGS. 10-11. This design serves to promote smooth turning of the forward module 102 as shown in FIG. 5.

The pair of front hydraulic cylinders 150 are connected in a push-pull relationship as shown in FIGS. 4 and 6. The variable length strut 146 is connected between the draw bar 114 and the forward dolly 120a of the forward module 102 as shown in FIGS. 3 and 6 but shown best in FIG. 10. In the embodiment shown in FIGS. 3 and 6, the variable length strut 146 is connected to the left forward dolly 120a (left side of the first single central spine 130). However, it will be appreciated that the variable length strut 146 could alternatively be connected to the right forward dolly 120a (right side of the first single central spine 130). The variable length strut 146 includes a first section 192 and a second section 194 as shown in FIG. 7. The first section 192 and the second section 194 of the variable length strut 146 are longitudinally movable with respect to one another at a telescopic joint 145. In a preferred embodiment of the invention, the first section 192 and the second section 194 longitudinally move apart a total distance of approximately 0.13" as the variable length strut 146 contracts and expands at the telescopic joint 145.

Figure 9:
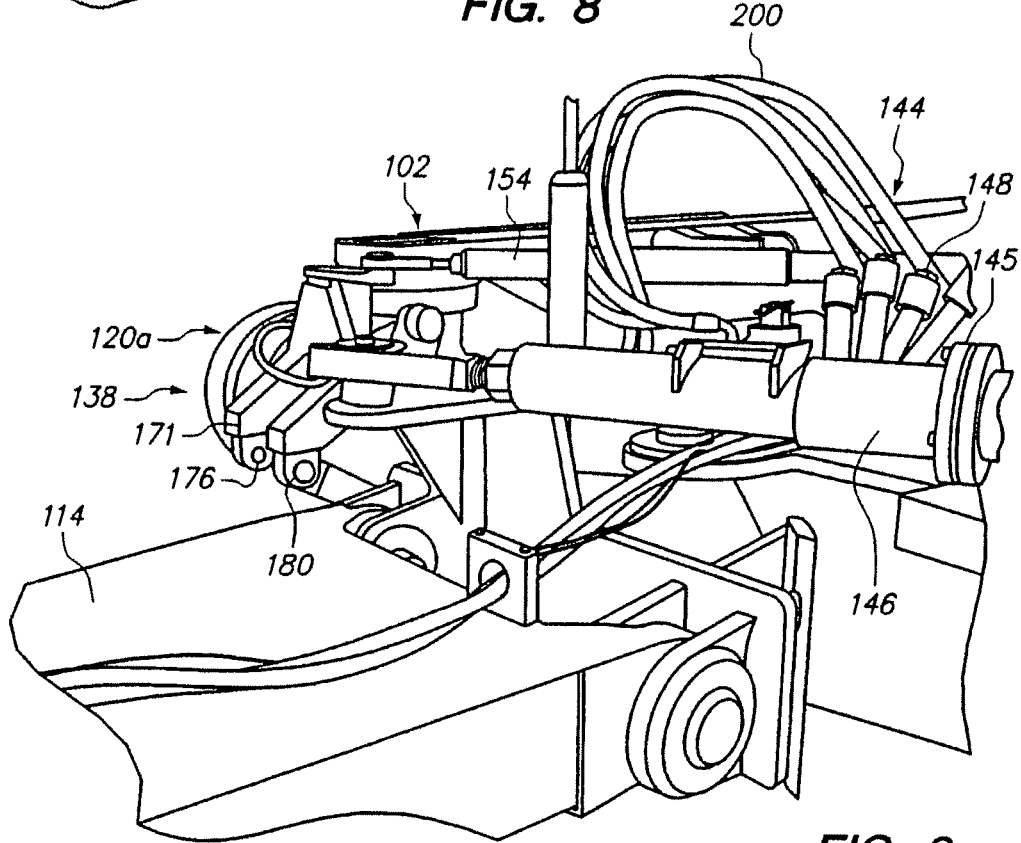
FIG. 9 is a perspective view of the draw bar connected to the forward module of the transport vehicle of FIG. 1 and showing the power steering valve and variable length strut of an automatic power steering unit.
Figure 12:
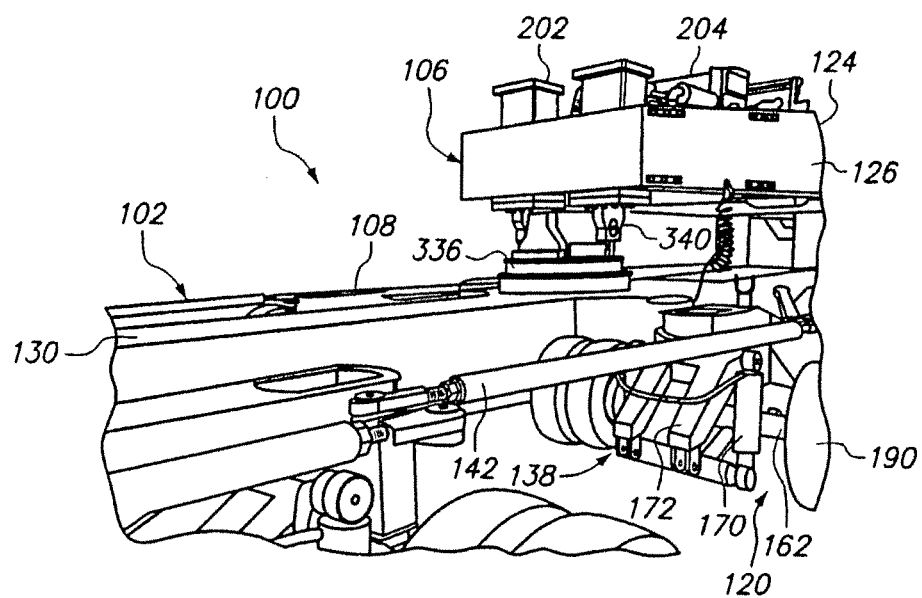
FIG. 12 is a perspective view of the rear portion of the forward module of the transport vehicle of FIG. 1 showing a forward main turn table mounted on the single central spine of the forward module for point loading.
Figure 13:
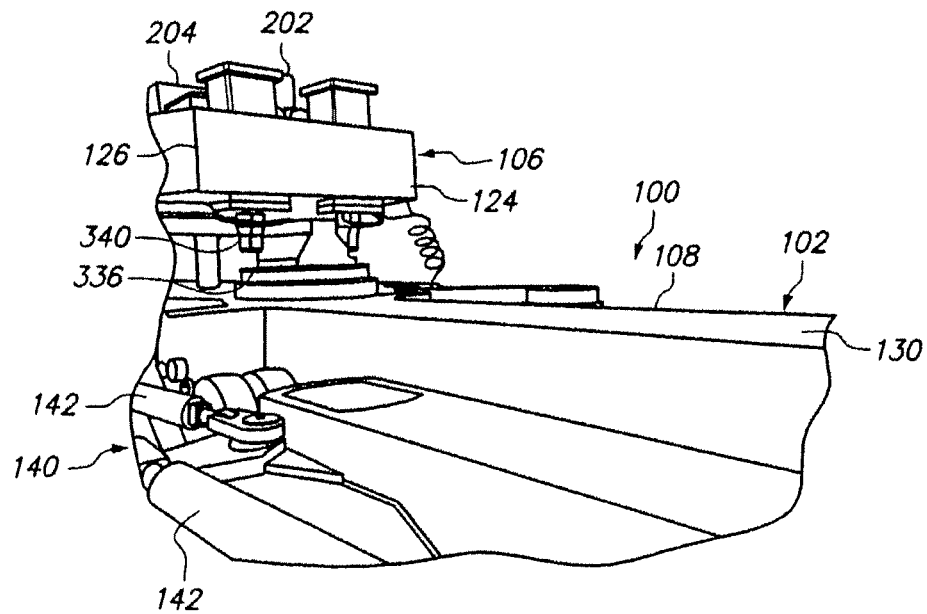
FIG. 13 is an alternative perspective view of the rear portion of the forward module of the transport vehicle of FIG. 1 showing the forward main turn table mounted on the single central spine of the forward module for point loading.
Figure 14:
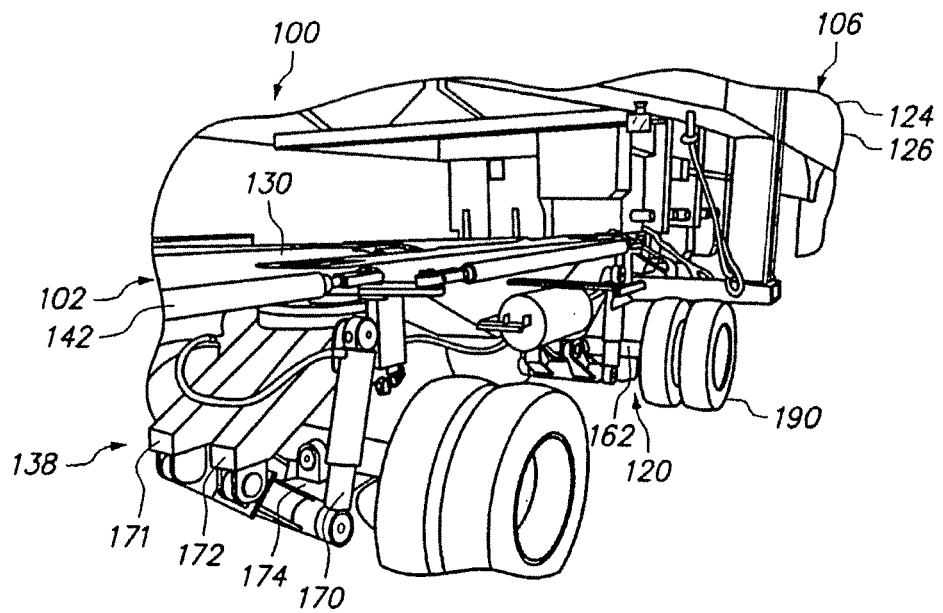
FIG. 14 is a side perspective view of the forward module of the transport vehicle of FIG. 1 showing the hydraulic axle suspension system and the side steering rods of the present invention.

The hydraulic power steering valve 148 shown in FIG. 3 but shown best in FIGS. 7 and 9 is coupled along with the variable length strut 146. Hydraulic steering valve 148 has a first end 196 and a second end 198 as is clearly shown in FIG. 7 and is of the type available from Garrison Manufacturing of Santa Ana, Calif. The first end 196 of the power steering valve 148 is connected to the first section 192 of the variable length strut 146 while the second end 198 of the power steering valve 148 is connected to the second section 194 of the variable length strut 146. That is to say, the power steering valve 148 is attached by parallel connection across the telescopic joint 145 of the variable length strut 146. Because of this connection, as section 192 and section 194 longitudinally move with respect to one another, their relative position is directly coupled to the power steering valve 148. As shown in FIG. 7, the power steering valve 148 is hydraulically connected by hydraulic lines 200 to the pair of front hydraulic cylinders 150 and to a hydraulic pump (not shown) and a hydraulic fluid reservoir (not shown). The hydraulic pump (not shown) and the hydraulic fluid reservoir (not shown) are located in a forward equipment section 202 of the transport frame 124 as shown in FIGS. 12 and 13.

When the draw bar 114 is rotated such as when the forward prime move 112 (towing vehicle) turns as is illustrated in FIGS. 5 and 6, the first section 192 and the second section 194 of the variable length strut 146 longitudinally move with respect to one another. The relative longitudinal motion of the first section 192 and the second section 194 causes the power steering valve 148 to assume a hydraulic switching state. That switching state can be one of (1) a left state which causes the front wheels 190 of the forward dolly 120a to turn (move) in a left direction, (2) a right state which causes the front wheels 190 of the forward dolly 120a to turn in a right direction, or (3) a neutral state which causes turning motion to cease but leaves the wheels 190 pointing in the last ordered direction. The hydraulic switching state is communicated to the pair of front hydraulic cylinders 150 which in turn, via forward steering crank 156 and the pair of forward V-shaped steering rods 154, cause the front axles 157 (of the plurality of axles 136) and the set of wheels 190 comprising the forward dollies 120 to turn in the left direction (as shown in FIGS. 5 and 6), or alternately, in the right direction. When the rotation of the draw bar 114 is stopped, the power steering valve 148 assumes the neutral hydraulic switching state wherein further turning in the left direction or the right direction ceases. That is, the front axle 157 (of the plurality of axles 136) and the set of wheels 190 of the forward dollies 120 stop turning, that is, stop rotationally moving. However, the front axles 157 and set of wheels 190 remain in the turned configuration.

Referring to FIG. 1 and also to FIGS. 2 and 5, it is clearly shown that there are three forward dollies 120a, 120b and 120c in the forward module 102. The forward dollies 120b and 120c shown in FIGS. 2 and 5 are each mechanically linked to the forward dolly 120a via the axle steering system 140. This mechanical linkage of the axle steering system 140 is accomplished by a plurality of axle steering rods 142 as is clearly shown in FIGS. 1, 2, 10, and 15. The plurality of axles 136 are interconnected by the axle steering rods 142. The axle steering rods 142 comprise a plurality of side steering rods 142 positioned at or below the height of both the first single central spine 130 of the forward module 102 and the second single central spine 132 of the rearward module 104. This design enables the top surface of the forward module 102 and the rearward module 104 to carry a load separate from the load supported by the carrying beams 126 of the transport frame 124 as shown in FIGS. 10, 12, 13 and 14. The interconnected axle steering system 140 is actuated by the draw bar 114, the variable length strut 146, and the power steering valve 148. The hydraulic fluid is directed to the pair of front hydraulic cylinders 150 where the push-pull action of the front hydraulic cylinders 150 operates the pair of forward V-shaped steering rods 154.

The forward V-shaped steering rods 154 function to control the plurality of axle steering rods 142. The side axle steering rods 142 serve to transmit the turning force from the pair of forward V-shaped steering rods 154 to the forward dolly 120a. The axle steering system 140 is a closed system in which all the side steering rods 142 are tied together in a loop so that when the draw bar 114 is operated, all components in the closed loop are actuated. The variable length strut 146 is connected to the left forward dolly 120a (left side of the first single central spine 130) atop the structure 168 adjacent to the forward V-shaped steering rod 154 and the side axle steering rod 142 as shown in FIG. 10. Consequently, the motion of the draw bar 114, variable length strut 146 and the forward V-shaped steering rod 154 control the motion of the side axle steering rod 142. The motion imparted to the side axle steering rods 142 of the axle steering system 140 in the forward dolly 120a is then transmitted to the axle steering rods 142 of the forward dollies 120b and 120c as shown in FIGS. 2 and 5. This transfer of motion is made possible by the connection of the axle steering rods 142 of the forward dolly 120a to the axle steering rods 142 of forward dollies 120b and 120c as is illustrated, for example, in FIGS. 10, 12 and 14. It is noted that the side axle steering rods 142 are present in the axle steering system 140 but do not exist in the caster suspension system 186 described herein below in FIGS. 1 and 27.

Figure 15:
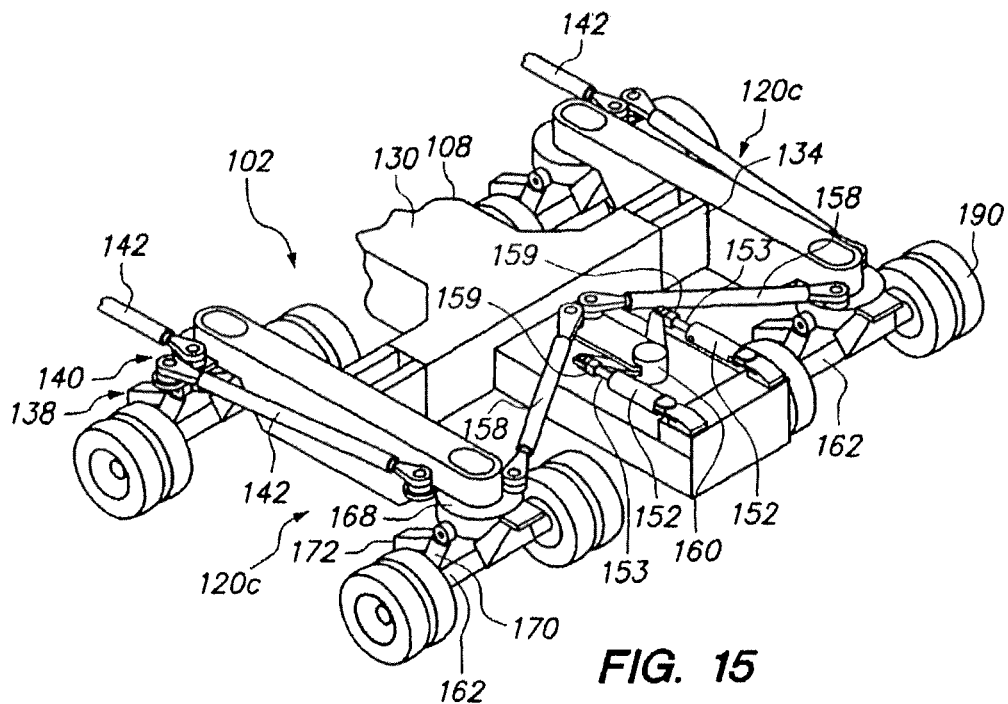
FIG. 15 is a perspective view of the rear portion of the forward module of the transport vehicle of FIG. 1 showing additional structure of the automatic power steering unit including a pair of push-pull pistons and a pair of V-shaped steering rods.

Additionally, the forward dolly 120c of the forward module 102 shown in FIGS. 2 and 5 includes the pair of rear hydraulic cylinders 152 as is clearly shown in FIG. 15. The pair of rear hydraulic cylinders 152 are also arranged in a push-pull relationship, and are mechanically connected to the forward dolly 120c of the forward module 102 via the rearward steering crank 160 and the pair of rearward V-shaped steering rods 158 as shown in FIG. 15. The power steering valve 148 located in forward dolly 120a is also hydraulically connected to the pair of rear hydraulic cylinders 152 located in forward dolly 120c. A pair of rear limiting blocks 159 is provided with one rear limiting block 159 mounted upon each of the piston rods 153 as shown in FIG. 15. The rear limiting blocks 159 mounted on the piston rods 153 in forward dolly 120c cooperate with the corresponding rear hydraulic cylinders 152 to limit the travel and turning radius of each set of wheels 190 of the forward module 102 to an appropriate angle to promote smooth turning of the forward module 102 as shown in FIG. 5.

In particular, the variable length strut 146 and the power steering valve 148 which are activated by the draw bar 114 control both the pair of front hydraulic cylinders 150 and the pair of rear hydraulic cylinders 152 of the forward module 102. Note, the pair of rear hydraulic cylinders 152 always operate in a direction opposite to the direction of the pair of front hydraulic cylinders 150 in the same module. The hydraulic system of the present invention is a closed system wherein if the forward dolly 120a moves in a left direction, then the forward dolly 120c moves in a right direction. Consequently, when the pair of front hydraulic cylinders 150 of the forward module 102 move in a first sequential direction, the pair of rear hydraulic cylinders 152 of the forward module 102 move in an opposite sequential direction. This action is caused by the connections of the axle steering rods 142 positioned along the sides of the plurality of forward dollies 120. According to design, each of the axle steering rods 142 are connected together in a loop as is shown in FIGS. 1-3. Consequently, each of the axles 157 of the forward dolly 120a are connected in a loop to the axles 162 of the rearward dolly 120c of the forward module 102. The same design applies to the rearward module 104. Because all of the axles in the forward module 102 are connected together with steering rods 142, the transport vehicle 100 is (1) capable of traveling up to high speeds of thirty-five miles per hour in a loaded state (e.g., when carrying the payload 110), and at higher speeds in an unloaded state (e.g., when not carrying a payload 110), and (2) the transport vehicle 100 can be moved in the reverse direction for traveling backwards (which was not possible in prior art transport trailers). The unitary construction of the dual lane transport body 108 facilitates maneuvering the transport vehicle 100 in the reverse direction.

It is also noted that the pair of front hydraulic cylinders 150 and the pair of rear hydraulic cylinders 152 of the rearward module 104 operate in the same manner as those of the forward module 102. Instead of using a draw bar as in the forward module 102, the steering wheel 164 located in the steering cab 166 as shown in FIG. 33 is utilized to control the set of wheels 190 and axles 136 comprising the rearward dollies 122a, 122b, 122c of the rear module 104 shown in FIG. 1. It is emphasized that the forward module 102 and the rearward module 104 each include identical automatic power steering systems 144 and identical axle steering systems 140. Thus, the rearward module 104 includes the same hardware as the forward module 102 including the pair of front hydraulic cylinders 150, pair of forward V-shaped steering rods 154, pair of front limiting blocks 155, forward steering crank 156, and the pair of rear hydraulic cylinders 152, pair of rearward V-shaped steering rods 158, pair of rear limiting blocks 159, and the rearward steering crank 160. These components are shown in FIGS. 1, 10, and 11 for the plurality of forward dollies 120a, 120b, 120c and apply equally to the plurality of rearward dollies 122a, 122b, 122c as shown in FIG. 15. As with the forward module 102, the operation of the pair of front hydraulic cylinders 150 and the pair of rear hydraulic cylinders 152 of the rearward module 104 operate in opposite directions. Thus, when the rearward dolly 122a moves in a left direction, the rearward dolly 122c of the rearward module 104 moves in a right direction. Consequently, when the pair of front hydraulic cylinders 150 of the rearward module 104 move in a first sequential direction, the pair of rear hydraulic cylinders 152 of rearward module 104 move in an opposite sequential direction. This action is caused by the connections of the axle steering rods 142 positioned along the sides of the plurality of rearward dollies 122.

There is no draw bar associated with the rearward module 104 of the present invention. The rearward module 104 includes the rear steering cab 166 which is employed to steer the rearward module 104 via the steering wheel 164. The steering wheel 164 is operator controlled and shown in FIG. 33. The steering cab 166 is clearly shown in FIGS. 33 and 34. Essentially, the rearward module 104 is identical to the forward module 102 except for the fact that the rearward module 104 does not include the draw bar 114. However, the rearward module 104 could, if desired, be fitted with a draw bar. The arrangement of the axle steering rods 142 is the same in the rearward module 104 as in the forward module 102 for providing all-axle steering to each set of wheels 190. Each of the axle steering rods 142 of the axle steering system 140 are positioned along the side of and at a height no greater than the height of the first single central spine 130 of the forward module 102 and the second single central spine 132 of the rearward module 104. This arrangement of the axle steering rods 142 ensures that the top surfaces of the first single central spine 130 and the second single central spine 132 are available as a load carrying surface.

The automatic power steering system 144 shown best in FIG. 10 requires several steps in the process of turning the multi-axle transport vehicle 100. Referring to FIG. 1, the forward prime mover 112 makes a turn so that the draw bar 114 rotates. Rotation of the draw bar 114 applies a force to the telescopic joint 145 of the variable length strut 146 which experiences a telescopic movement resulting in actuating the power steering valve 148. Thus, movement of the draw bar 114 causes a shift in the position via expansion or contraction of the variable length strut 146 at the telescopic joint 145 and the power steering valve 148 that controls the supply of hydraulic fluid to the pair of front hydraulic cylinders 150 and the pair of rear hydraulic cylinders 152, respectively. Consequently, the power steering valve 148 transmits a signal to send pressurized hydraulic fluid to the front hydraulic cylinders 150 and the rear hydraulic cylinders 152. This results in the automatic power steering system 144 directing hydraulic fluid to the right side of the hydraulic system for a right turn of the draw bar 114, or directing hydraulic fluid to the left side of the hydraulic system for a left turn of the draw bar 114. This action results because the position of the power steering valve 148 controls where the hydraulic fluid is directed to control the steering of the transport vehicle 100.

Figure 28:
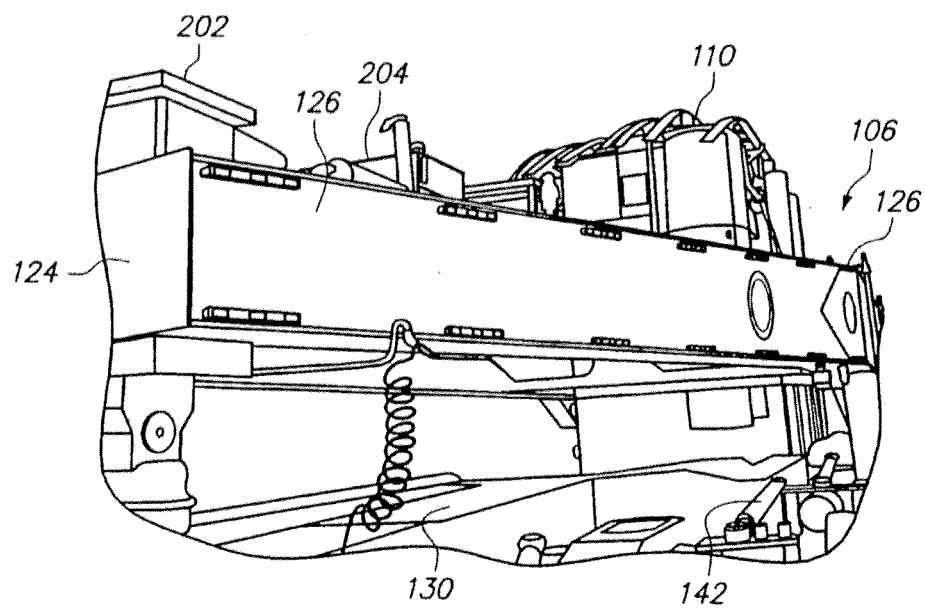
FIG. 28 is a partial perspective view of the transport frame of the transport vehicle of FIG. 1 showing a pair of transport carrying beams that comprise the load bearing section.

Additionally, a diesel engine 204 located in the forward equipment section 202 of the transport frame 124 shown in FIGS. 12, 13 and 28 provides a constant power source to the automatic power steering system 144. Therefore, the pressurized hydraulic fluid utilized in the automatic power steering system 144 is supplied by a pump (not shown) energized by the diesel engine 204. The pressurized hydraulic fluid applied to the front hydraulic cylinders 150 and the rear hydraulic cylinders 152 apply a force to and resulting movement of the respective pivot points 151. This action results in movement of the pair of forward V-shaped steering rods 154 and the pair of rearward V-shaped steering rods 158 as shown in FIGS. 10 and 15. Thereafter, the mechanical steering rod linkage, i.e., the axle steering rods 142 of the axle steering system 140, operate to position each of the plurality of axles 136 and wheels 190 of the transport body 108 for a corresponding rotation of the draw bar 114. In other words, the power steering valve 148 which is manipulated by the movement of the draw bar 114 controls the direction of the pressurized hydraulic fluid to the front hydraulic cylinders 150 and the rear hydraulic cylinders 152. The front hydraulic cylinders 150 and the rear hydraulic cylinders 152 then operate to control the forward V-shaped steering rods 154 and the rearward V-shaped steering rods 158 and the corresponding side steering rods 142. This action controls the direction in which the transport vehicle 100 turns.

A top plan view of the multi-axle transport vehicle 100 is shown in FIG. 5 illustrating a left hand turn. Through the action of the draw bar 114, the variable length strut 146, power steering valve 148, pair of front hydraulic cylinders 150, forward steering crank 156, and the pair of forward V-shaped steering rods 154, the forward axles 157 and the wheels 190 of the forward dolly 120a have steered to the left. This steering motion has been coupled to the forward axles 157 and wheels 190 of the forward dollies 120b and 120c via the axle steering rods 142 of the axle steering system 140. The pair of rear hydraulic cylinders 152 have similarly been activated by the power steering valve 148 to assist in the turning action. An enlarged view of area 6 of FIG. 5 showing the various components of the forward dolly 120a in a turning configuration is shown in FIG. 6.

The dual lane, multi-axle transport vehicle 100 of the present invention shown in FIG. 1 is typically moved from one location to another as a unitary constructed vehicle. The unitary constructed vehicle is defined herein as the forward module 102, load bearing means 106 and the rearward module 104 each being connected together as a single unit. An example of the movement of the transport vehicle 100 is the movement from the home base truck yard to and from a customer's job site when the transport vehicle 100 is typically unloaded. Although the transport vehicle 100 can be disassembled if desired, disassembly for relocation purposes is seldom practiced. This is the case since many man hours are required to disassemble the transport vehicle 100 and dispatch it to another location via conventional trailer trucks where it is reassembled. However, with the price of fuel ever increasing, the disassembly feature is still a valuable alternative. Consequently, the transport vehicle 100 is modular in nature. The high speed, dual lane transport body 108 includes the forward module 102 and the rearward module 104 as is clearly shown in FIG. 1. Both the forward module 102 and the rearward module 104 include a central spine construction. In particular, the forward module 102 includes the first single central spine 130 and the rearward module 104 includes the second single central spine 132 as shown in FIG. 1. Each of the first single central spine 130 and the second single central spine 132 are the main structural members of the forward module 102 and the rearward module 104, respectively, each being comprised of light weight T-1 steel. Each of the first single central spine 130 and the second single central spine 132 are also useful in carrying a separate payload thereon. This feature is made possible by ensuring that each of the plurality of axle steering rods 142 are positioned at a height no greater than the height of the first single central spine 130 or the second single central spine 132.

The transport vehicle 100 includes the plurality of forward dollies 120a, 120b, 120c and the plurality of rearward dollies 122a, 122b 122c, respectively. It is noted that the forward dollies 120a, 120b and 120c are each removably connected to the first single central spine 130. Likewise, the rearward dollies 122a, 122b and 122c are each removably connected to the second single central spine 132. Because the individual components of the present invention can be disconnected, the transport vehicle 100 can be disassembled and moved from location to location using conventional transportation means. This modularity feature also allows the width of the transport vehicle 100 to be adjusted for operating conditions using different widths of connectors 134 as described herein. The different widths of connectors 134 are employed to accommodate road conditions and/or government regulations.

An enlarged top plan view of the forward module 102 of the transport vehicle 100 is shown in FIG. 2. The rearward module 104 is not shown in this view. The forward module 102 comprises dolly pairs 120a, 120b and 120c as shown in FIG. 2. It is understood that each of the dolly pairs 120a, 120b and 120c is actually comprised of two dollies, one located on the right side and one located on the left side of the first single central spine 130 looking forward toward the forward prime mover 112. It is noted that each dolly 120a, 120b and 120c has two front axles 157 with four wheels 190 fitted on each front axle 157 as shown in FIGS. 2 and 3. An elongated central member or axle beam 208 connects the two front axles 157 together. The dollies 120a, 120b and 120c can be removably connected to the first single central spine 130 by a corresponding plurality of connectors 134 as is clearly shown in FIGS. 5-6 but best shown in FIGS. 36-38. Three dolly pairs 120a, 120b and 120c (six actual dollies 120) and six connectors 134 are shown in the embodiment of FIGS. 2 and 5. Each of the dolly pairs 120a, 120b and 120c can be removably connected to the first single central spine 130 by a single connector 134.

Figure 37:
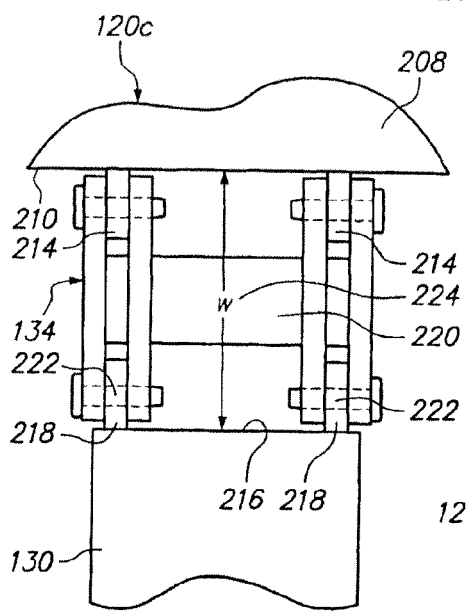
FIG. 37 is an enlarged top plan view of area 37 of FIG. 6 of the connector positioned between the dolly and the single central spine of the transport vehicle of FIG. 1.
Figure 38:
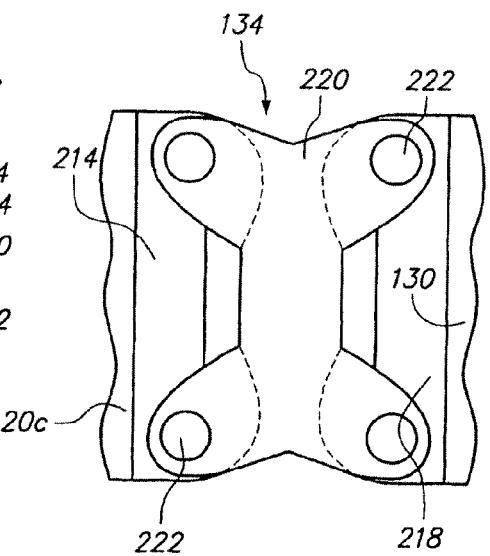
FIG. 38 is an enlarged side elevation view of the connector shown in FIG. 37 illustrating four attachment pins for securing the connector to the dolly and the single central spine of FIG. 1.

An enlarged fragmented top plan view of the pair of forward dollies 120c, the first single central spine 130, and the pair of connectors 134 is shown in FIG. 36. An enlarged top plan view of area 37 (shown in FIG. 36) is clearly shown in FIG. 37 and illustrates the construction of a connector 134 utilized to connect and disconnect, for example, the forward dolly 120c from the first single central spine 130. Further, an enlarged side elevation view of the connector 134 shown in FIG. 37 is clearly illustrated in FIG. 38. It is noted that the connectors 134 can be utilized to connect and disconnect both the forward dollies 120a, 120b, 120c and the rearward dollies 122a, 122b, 122c from the first single central spine 130 and the second single central spine 132, respectively. There are six connectors 134 (also known as "dog bones" because of their distinctive shape as shown in FIG. 38) per forward module 102 and per rearward module 104. It can be seen in FIG. 36 that the removal of any of the connectors 134 physically disconnects the elongated central member or axle beam 208 from the first single central spine 130 of the forward module 102 or, in the alternative, from the second single central spine 132 of the rearward module 104. This action enables the forward dollies 120 and the rearward dollies 122 to be hitched to or loaded onto a conventional trailer (not shown) and transported over extended distances, if desired.

Each connector 134 comprises a plurality of components which are shown in FIGS. 36-38. The elongated central member or axle beam 208 has a vertical side 210 and a middle portion 212 (see FIG. 36). The components of the connector 134 include a pair of first flanges 214 which are disposed on the vertical side 210 of, for example, the forward dolly 120c at the middle portion 212 of the axle beam 208. The first single central spine 130 includes a vertical side 216 as shown in FIG. 37. A pair of second flanges 218 are disposed on the vertical side 216 of the first single central spine 130. A connecting member 220 connects the pair of first flanges 214 of the forward dolly 120c to the pair of second flanges 218 of the first single central spine 130 as shown in FIGS. 37 and 38. The connection is effected by a plurality of pins 222. The connecting members 220 each exhibit a width "w" represented by numeral 224 (see FIG. 37) which determines the overall width "W" represented by numeral 226 of the forward module 120c as shown in FIG. 36. Consequently, the connecting members 220 having a wider dimension "w" represented by numeral 224 will result in a wider transverse wheel base "W" represented by numeral 226. The width of the multi-axle transport vehicle 100 typically falls within the range of 18' 0"-to-20' 0" depending upon the width "w" (represented by the numeral 224) of the connecting members 220.

The weight load permitted to be carried by an "on road" transport vehicle which is authorized to travel on highways and over bridges of the state is regulated and is typically determined by the number and spacing of the axles of the transport vehicle. For example, in the State of California, the California Department of Transportation (CalTrans) is charged with the responsibility of regulating weight loads carried by transport vehicles over highways and bridges. Each of the forward dollies 120a, 120b and 120c of the forward module 102 and each of the rearward dollies 122a, 122b and 122c of the rearward module 104 is comprised of an elongated central member or axle beam 208 and a pair of axles 136 as shown in FIG. 36. The California Department of Transportation has established a maximum weight load permitted under the law to be carried by a transport vehicle and for safe bridge crossings when the axle spacing is 9' 0" and the length of each axle is 7' 0".

In the dual lane, multi-axle transport vehicle 100 of the present invention, the spacing of axles 136 of wheels sets 190 of the hydraulic suspension system 138 and of wheel sets 190 of the caster suspension system 186 (discussed herein below) is 9' 0". This means that the distance from the front axle 157 (see FIG. 3) located at the center of the front wheel set 190 to the axle 157 (see FIG. 3) located at the center of the rear wheel set 190 of the same forward dolly 120a in the forward module 102 (or, in the alternative, the same rearward dolly 122a in the rearward module 104) is 9'0". Consequently, the 9' 0" axle separation is referred to as being measured, for example, from the axle center (of the axle 157 at the forward portion of the dolly 120a) to the axle center (of the axle 157 at the rearward portion of the dolly 120a) of the same wheel set 190 as shown in FIG. 3. This axle spacing measurement is shown in FIG. 36 as the length $L_1$ and identified by the numeral 230. Furthermore, the length of each axle 162 (e.g., rear axle 162 in forward dolly 120c shown in FIG. 36) from the outer wheel 190 on one end of the axle 162 to the outer wheel 190 on the opposite end of the same axle 162 is 7' 0". This axle length measurement is also shown in FIG. 36 as the length $L_2$ and identified by the numeral 232. This arrangement of the spacing between axles (axle spacing) within the same dolly and the length of all axles (axle length) affords the maximum spread of all wheel sets to transport the maximum weight permitted by state regulatory agencies. It is further noted that utilizing rear axles 162 (as shown in FIG. 36) having a length of 7' 0" and an axle separation of 9' 0" requires the use of the first spaced apart arm 171 and second spaced apart arm 172 ("double knee" construction) in combination with the first fluid activated cylinder 169 and second fluid activated cylinder 170 ("double piston" construction) to maintain axle stability and reduce axle yaw caused by road induced forces.

Figure 18:
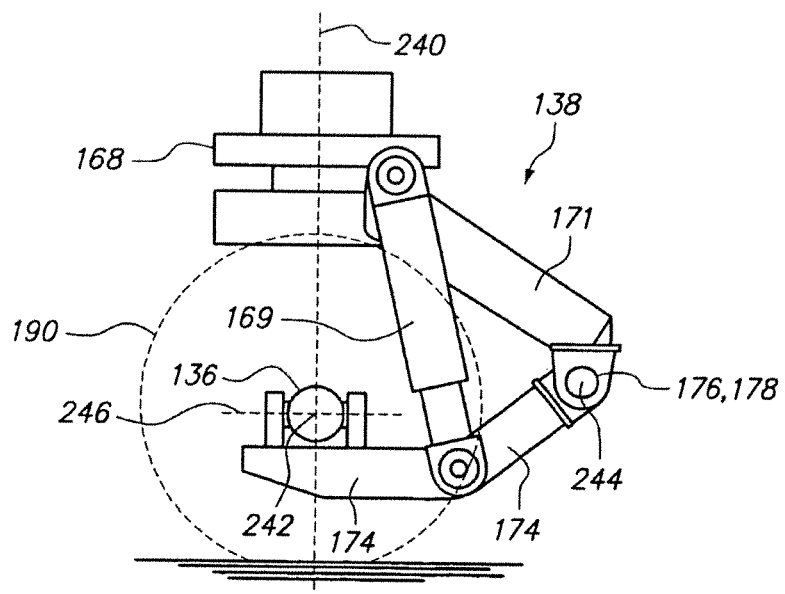
FIG. 18 is a side elevation view of the hydraulic axle suspension system of FIG. 1 of the present invention.
Figure 19:
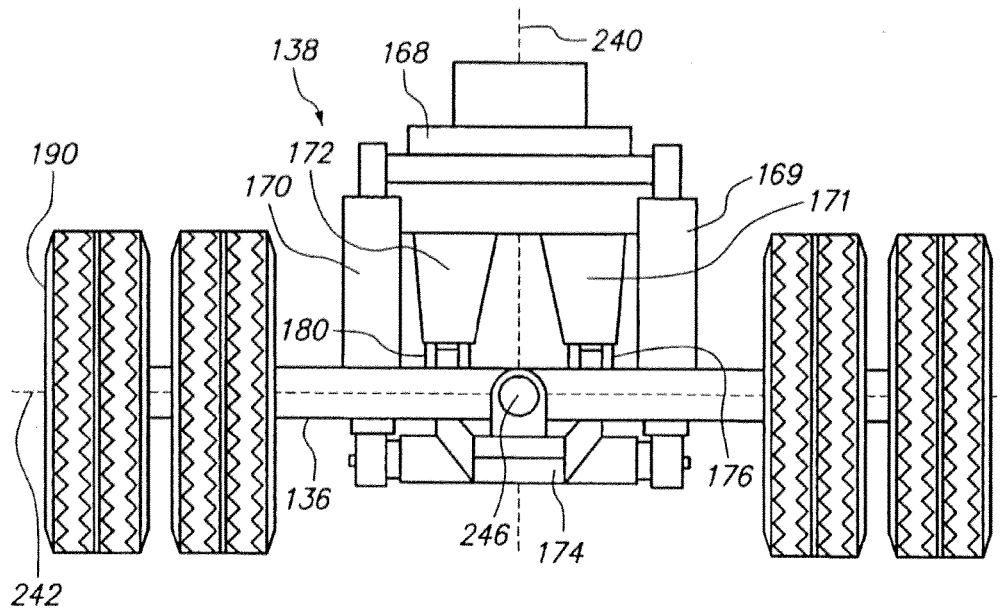
FIG. 19 is a rear elevation view of the hydraulic axle suspension system of FIG. 1 of the present invention.
Figure 20:
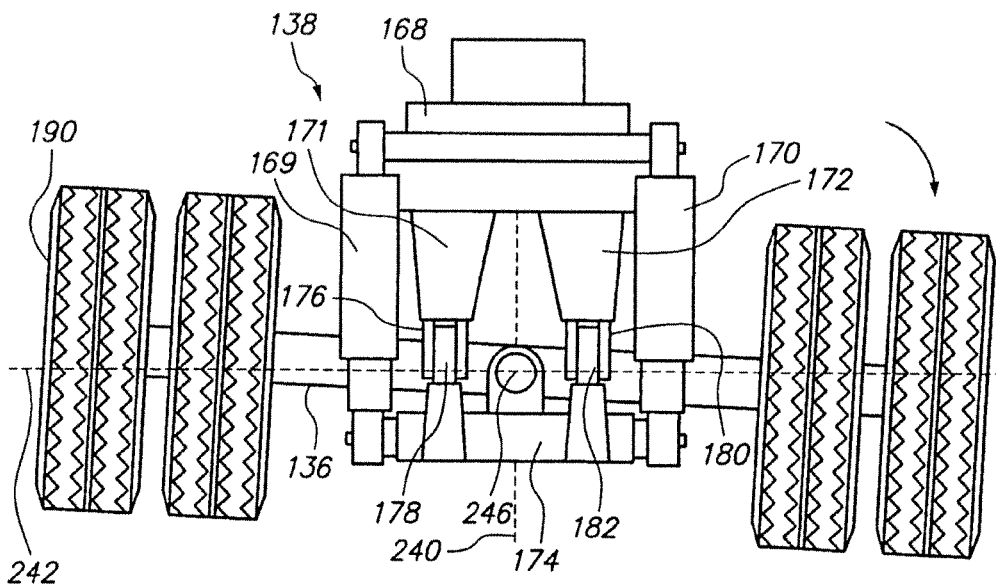
FIG. 20 is a front elevation view of the hydraulic axle suspension system of FIG. 1 with an axle rotated in a clockwise direction.
Figure 21:
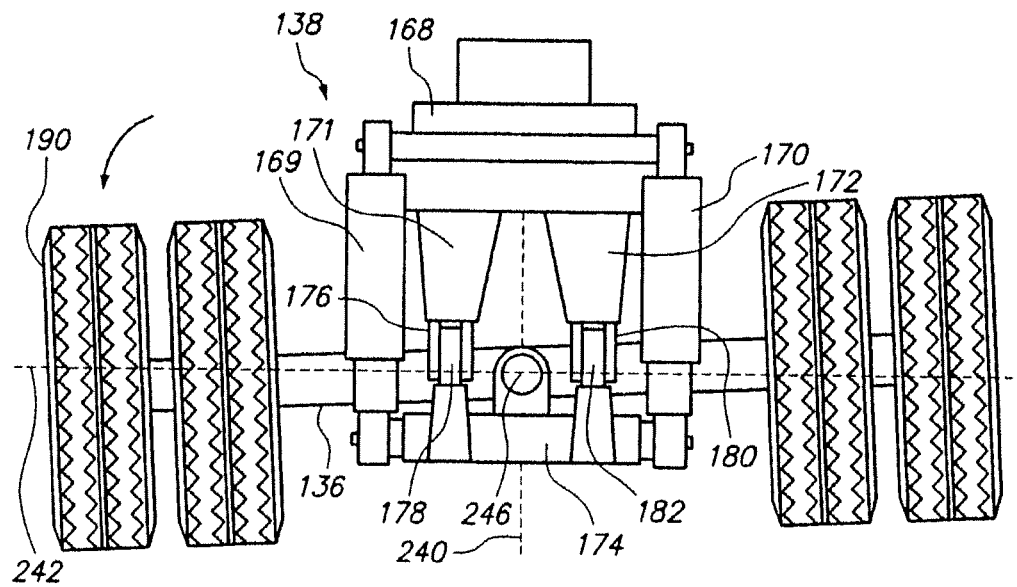
FIG. 21 is a front elevation view of the hydraulic axle suspension system of FIG. 1 with the axle rotated in a counter-clockwise direction.

The hydraulic suspension system 138 of the multi-axle transport vehicle 100 serves to dynamically stabilize the axles 136 of the high speed, dual lane transport body 108 and tends to resist axle yaw. The hydraulic suspension system 138 for conventional wheel sets 190 is disclosed as follows and is shown in FIG. 1 and more particularly in FIGS. 17-25. Front, side and rear elevation views, respectively, of the hydraulic suspension system 138 for the multi-axle transport vehicle 100 in accordance with the present invention are illustrated in FIGS. 17-19. The hydraulic suspension system 138 includes the structure 168 which is pivotable about a first nominally vertical axis 240 as shown in FIG. 17. The structure 168 further includes the first attachment station 176 spaced apart from the second attachment station 180. In the embodiment shown, the structure 168 of the suspension system 138 includes the first arm 171 and the second arm 172 having distal ends upon which the first attachment station 176 and the second attachment station 180 are respectively disposed. The axle 136 is disposable along a second axis 242 which is perpendicular to first vertical axis 240 as shown in FIGS. 17 and 18. Axle 136 is nominally aligned with the second axis 242. However, axle 136 can pivot or roll with respect to the second axis 242 as a function of the road surface as is illustrated in FIGS. 20 and 21. The axle 136 includes the set of wheels 190 including tires disposed at its two ends.

The axle linkage member 174 has the third attachment station 178 spaced apart from the fourth attachment station 182. The third attachment station 178 of the axle linkage member 174 is pivotally connected to the first attachment station 176 of the structure 168 of the hydraulic suspension system 138, and the fourth attachment station 182 of axle linkage member 174 is pivotally connected to the second attachment station 180 of the structure 168. The axle linkage member 174 is pivotable about a third axis 244 which is parallel to the second axis 242 as shown in FIGS. 17 and 18. The axle 136 is pivotally connected to the axle linkage member 174 and is pivotable about a fourth axis 246 shown in FIGS. 17 and 18. The fourth axis 246 is perpendicular to the first vertical axis 240, second axis 242, and third axis 244. Please refer also to FIGS. 20 and 21 to see the four axes 240, 242, 244, 246 in relation to the pivotable rotation of the axle 136.

At least one fluid activated cylinder is pivotally connected between the structure 168 of the hydraulic suspension system 138 and the axle linkage member 174. Preferably, two spaced apart fluid activated cylinders including the first fluid activated cylinder 169 and the second fluid activated cylinder 170 are pivotally connected between the structure 168 and the axle linkage member 174 as shown in FIGS. 17, and 19-21. The first fluid activated cylinder 169 and the second fluid activated cylinder 170 are disposed outside of the first attachment station 176, second attachment station 180, third attachment station 178, and fourth attachment station 182 as is best shown in FIG. 17. As defined herein, "outside" means that the first fluid activated cylinder 169 and the second fluid activated cylinder 170 reside closer to the wheels 190 and associated tires than to the four attachment stations 176, 178, 180, and 182. Thus, the first fluid activated cylinder 169 and the second fluid activated cylinder 170 are therefore spaced wider apart than the two pairs of attachment stations 176, 178 and 180, 182.

Figures 22A, 22B, 22C:
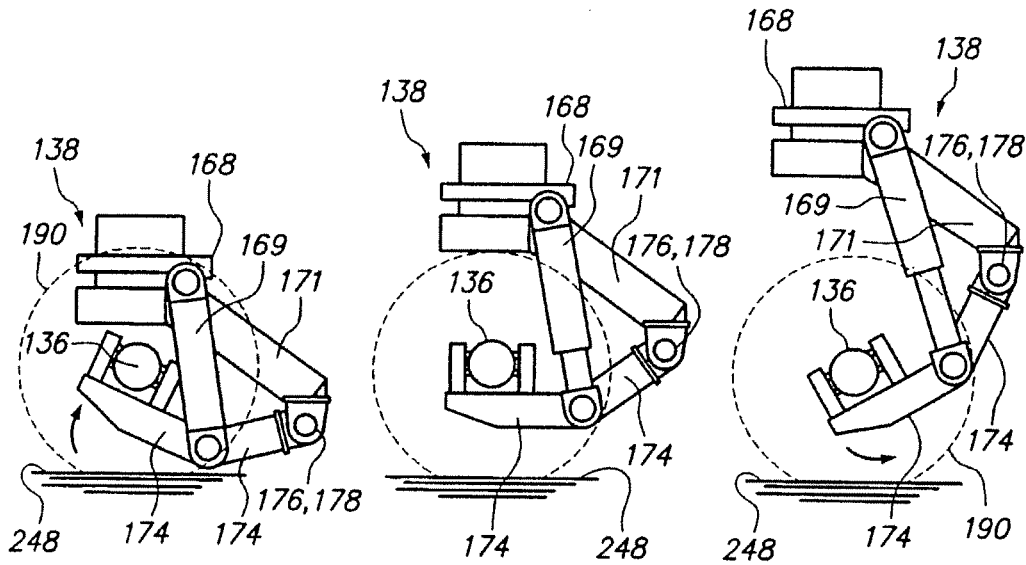
FIG. 22A is a side elevation view of the hydraulic axle suspension system of FIG. 1 in a fully retracted position.
FIG. 22B is a side elevation view of the hydraulic axle suspension system of FIG. 1 in a mid-stroke position.
FIG. 22C is a side elevation view of the hydraulic axle suspension system of FIG. 1 in a fully extended position.

A front elevation view of the hydraulic suspension system 138 where the axle 136 is rotated about the axis 246 in a clockwise direction is shown in FIG. 20. Likewise, another front elevation view of hydraulic suspension system 138 where the axle 136 is rotated about the axis 246 in a counterclockwise direction is shown in FIG. 21. The positions of the hydraulic suspension system 138 shown in FIGS. 20 and 21, respectively, would occur when the dual lane, multi-axle transport vehicle 100 is traveling upon an inclined or crowned road surface. Further, side elevation views of the hydraulic suspension system 138 are shown in FIGS. 22A, 22B, and 22C in fully retracted, mid-stroke, and fully extended positions, respectively. The first fluid activated cylinder 169 is shown in a retracted position in FIG. 22A. This retracted position causes the axle linkage member 174 to pivot toward the structure 168 thereby lowering the transport vehicle 100. The first fluid activated cylinder 169 is shown in a mid-stroke position in FIG. 22B such as would be useful in traveling down the roadway 248 in the transport vehicle 100 under normal operating conditions. Finally, the first fluid activated cylinder 169 is shown in an extended position in FIG. 22C which causes the axle linkage member 174 to pivot away from the structure 168 of the hydraulic suspension system 138 thereby raising the transport vehicle 100. In each of the FIGS. 22A, 22B and 22C, the position of the second fluid activated cylinder 170 is congruent with the position of the first fluid activated cylinder 169 but hidden from view. It is noted that the full stroke of each of the first fluid activated cylinder 169 and the second fluid activated cylinder 170 is approximately 11".

In view of FIGS. 22A-22C, it is clear that the stroke of the axle linkage member 174, first spaced apart arm 171 and second spaced apart arm 172 of the hydraulic suspension system 138 results in greater vertical travel of the first fluid activated cylinder 169 and the second fluid activated cylinder 170. Consequently, the height to which the entire transport body 108 and transport vehicle 100 can be raised is greater than with the vertical hydraulic piston travel of the suspension systems of the prior art. Thus, an advantage of the present invention is that the hydraulic suspension system 138 enables the overall transport vehicle 100 of the present invention to achieve the height necessary to avoid ground obstacles while exhibiting a lower profile to avoid overhead utility lines, and a lower center of gravity to improve stability of the plurality of axles 136 for the payload 110 carried. In prior art transport vehicle suspension systems, the axle linkage member 174 of the present invention did not exist. As a result, the vertical height to which the transport vehicle of the prior art can achieve is limited to the vertical stroke of the hydraulic pistons which is less than the vertical height achievable with the axle linkage member 174 the present invention. Consequently, the prior art transport vehicles must sit higher resulting in interference with overhead utility lines and a higher center of gravity resulting in a higher profile vehicle exhibiting less stability.

Figure 23:
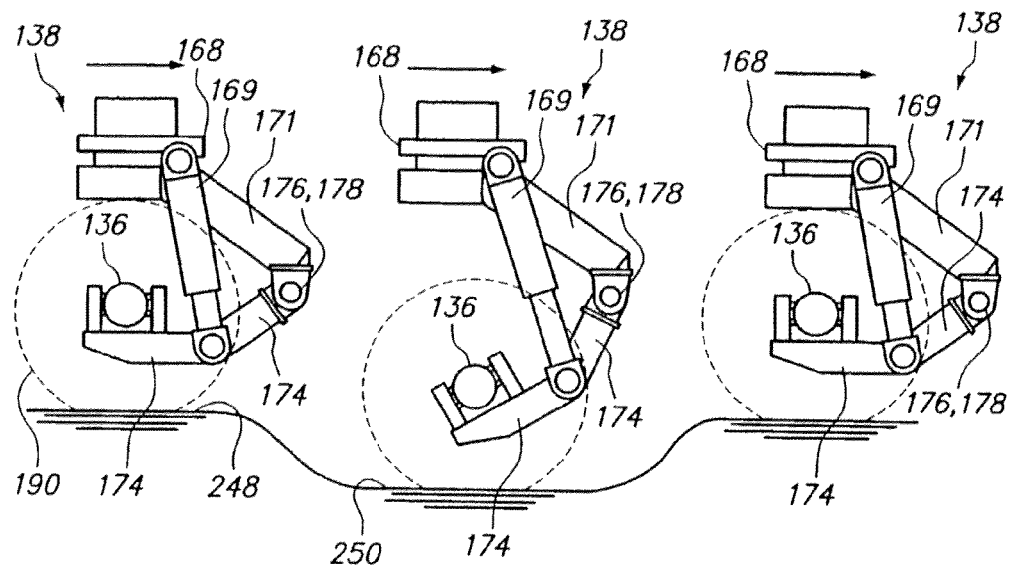
FIG. 23 is a side elevation view of the hydraulic axle suspension system of FIG. 1 when the tires encounter a pothole.
Figure 24:
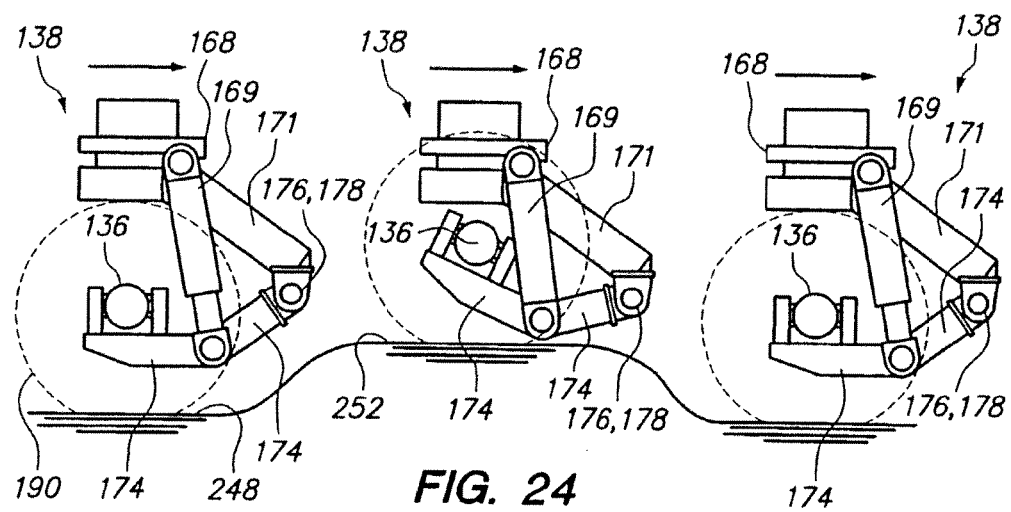
FIG. 24 is a side elevation view of the hydraulic axle suspension system of FIG. 1 when the tires encounter a bump.

A side elevation view of the hydraulic suspension system 138 of the dual lane, multi-axle transport vehicle 100 where the suspension system 138 is shown traveling along the roadway 248 is illustrated in FIG. 23. When the wheels 190 encounter a pothole 250 formed in the roadway 248, the hydraulic suspension system 138 automatically extends from a mid-stroke position shown in the left side view to an extended position shown in the middle view of FIG. 23. After passing over the pothole 248, the hydraulic suspension system 138 returns to the mid-stroke position shown on the right side view of FIG. 23, thereby cushioning the ride of the transport vehicle 100 to which the suspension system 138 is attached. Another side elevation view of the hydraulic suspension system 138 of the transport vehicle 100 where the suspension system 138 is shown traveling along the roadway 248 is illustrated in FIG. 24. When the wheels 190 encounter a bump 252 in the roadway 248, the suspension system 138 again automatically cushions the ride of the transport vehicle 100. In this situation, the suspension system 138 of the transport vehicle 100 retracts from a mid-stroke position shown in the left view to a retracted position shown in the middle view of FIG. 24. After passing over the crest of the bump 252, the hydraulic suspension system 138 then returns to the mid-stroke position shown in the right view of FIG. 24.

Figure 25:
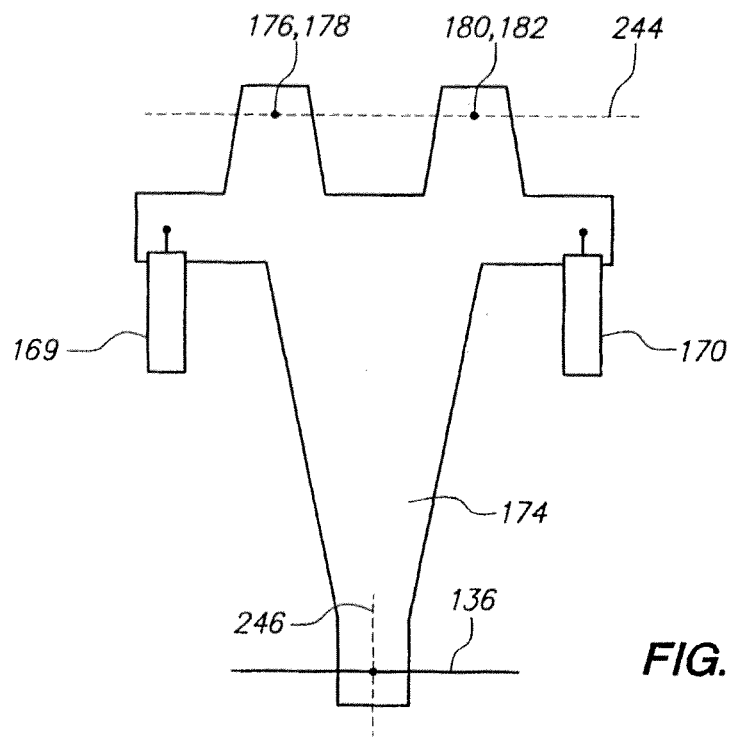
FIG. 25 is a simplified bottom plan view of the axle linkage member of the hydraulic axle suspension system of FIG. 1.

A simplified bottom plan view of axle linkage member 174 of the present invention is shown in FIG. 25. In the hydraulic suspension system 138, the axle linkage member 174 is not just connected to the structure 168 at one point as in the prior art. Please see Applicant's FIGS. 17-19. Rather, the axle linkage member 174 includes the four attachment points to structure 168 including (1) the first fluid activated cylinder 169, (2) attachment stations 176 and 178, (3) attachment stations 180 and 182, and (4) the second fluid activated cylinder 170. As a result of the four attachment stations or points, the axle linkage member 174 is rigidly locked in place with respect to the structure 168 and will therefore resist the tendency to yaw. Axle 136 is therefore always substantially perpendicular to the direction of travel. In other words, when the transport vehicle 100 is traveling on the roadway 248, the connection of the first attachment station 176 to the third attachment station 178, the connection of the second attachment station 180 to the fourth attachment station 182, and the connection of the two fluid activated cylinders (including the first fluid activated cylinder 169 and the second fluid activated cylinder 170) between the structure 168 and the axle linkage member 174 combine to reduce the yaw of axle 136 as shown in FIG. 25.

The hydraulic suspension system 138 for the transport vehicle 100 according to the preferred embodiment includes the structure 168 which is pivotable about the first vertical axis 240, the structure 168 having the first attachment station 176 separate and spaced apart from the second attachment station 180. The axle 136 is disposable along the second axis 242 which is perpendicular to the first vertical axis 240. The axle linkage member 174 has the third attachment station 178 which is spaced apart from the fourth attachment station 182. The third attachment station 178 of the axle linkage member 174 is pivotally connected to the first attachment station 176 of the structure 168, and the fourth attachment station 182 of the axle linkage member 174 is pivotally connected to the second attachment station 180 of the structure 168. The axle linkage member 174 is pivotable about the third axis 244 which is parallel to the second axis 242. The axle 136 is pivotally connected to the axle linkage member 174 and the axle 136 is pivotable about the fourth axis 246 which is perpendicular to the first vertical axis 240, second axis 242 and third axis 244. The two separate and spaced apart fluid activated cylinders 169, 170 are pivotally connected between the structure 168 and the axle linkage member 174, wherein the two fluid activated cylinders 169, 170 are disposed outside of the first attachment station 176, second attachment station 180, third attachment station 178, and fourth attachment station 182. When the two fluid activated cylinders 169, 170 are extended, the axle linkage member 174 pivots away from the structure 168. When the two fluid activated cylinders 169, 170 are retracted, the axle linkage member 174 pivots towards the structure 168.

Figure 26:
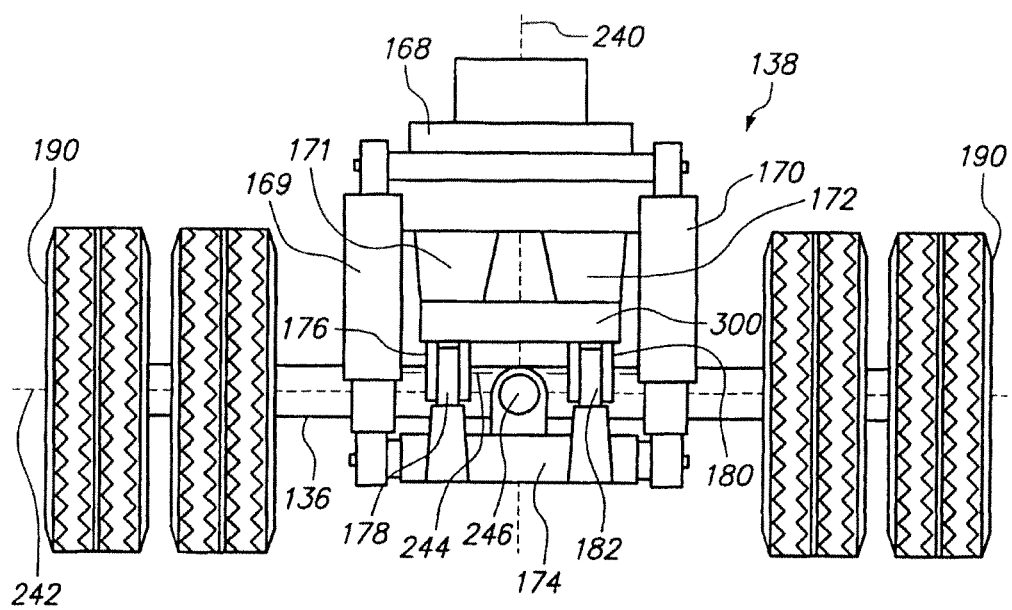
FIG. 26 is a front elevation view of a modified hydraulic axle suspension system of the transport vehicle of FIG. 1 incorporating a cross bar positioned over the pair of arms or knees for providing additional structure support.

An additional aspect of the hydraulic suspension system 138 of the present invention is shown in FIG. 26 which exhibits a modification not previously disclosed. The hydraulic suspension system 138 shown in FIG. 26 includes the structural combination previously disclosed in FIGS. 17-25 and described in the immediately preceding paragraph. In particular, the pair of spaced apart arms (or "knees") including the first spaced apart arm 171 and the second spaced apart arm 172 each extend from the structure 168 of the suspension system 138. The third attachment station 178 of the axle linkage member 174 is pivotally connected to the first attachment station 176 located on the first spaced apart arm 171 extending from the structure 168. Likewise, the fourth attachment station 182 of the axle linkage member 174 is pivotally connected to the second attachment station 180 located on the second spaced apart arm 172 extending from the structure 168 as shown in FIG. 26. In addition to this combination, a structural cross-bar 300 is physically affixed across the pair of spaced apart arms so that the first spaced apart arm 171 is mechanically secured to the second spaced arm 172 as illustrated in FIG. 26. The securing means can be by any suitable method but preferably by welding the lightweight T1 steel of which the pair of spaced apart arms 171 and 172 is comprised to the cross-bar 300 fashioned from the same or compatible metal. The function of the cross-bar 300 is to provide added structural security to the hydraulic suspension system 138 for supporting the forward dollies 120 and rearward dollies 122 which carry heavy payloads 110. The addition of the cross-bar 300 helps ensure the structural integrity of the high speed, dual lane transport body 108.

Figure 16:
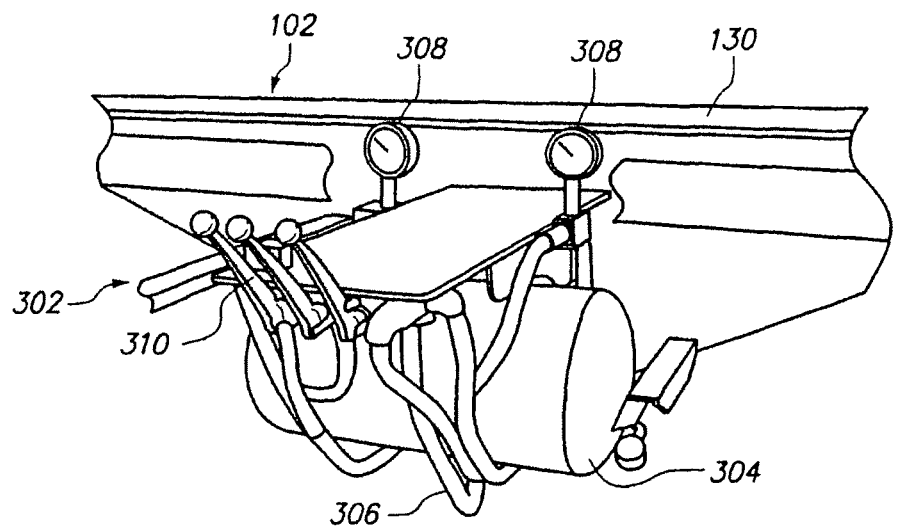
FIG. 16 is a perspective view of a hydraulic control station located on the forward module of the transport vehicle of FIG. 1.

A further feature of the present invention includes a manual steering and elevation station 302 also known as a hydraulic control station positioned at a suitable location on the transport body 108 such as, for example, the forward module 120. The manual steering and elevation station 302 is illustrated in FIG. 16 of Applicant's drawings and is utilized for raising and lowering the suspension system 138 of the transport vehicle 100 to avoid obstacles encountered on the roadway 248. Additionally, the manual steering and elevation station 302 is also an operator station from which the hydraulic system 138 of the transport vehicle 100 can be controlled. As illustrated in FIG. 16, the elevation station 302 includes a tank 304 containing hydraulic fluid, suitable hydraulic fluid lines 306, suitable mechanical gauges 308 for measuring hydraulic parameters, and control handles 310 to be manipulated by a trained operator (not shown). Typically, the transport vehicle 100 is steered from both the forward module 102 and the rearward module 104. Steering of the forward module 102 is typically controlled by the driver of the forward prime mover 112 in combination with the draw bar 114 and the automatic power steering system 144. Steering of the rearward module 104 is typically manually controlled by the operator controlled steering wheel 164 located in the steering cab 166 shown in FIG. 33.

Manual steering of the forward module 102 can be achieved from the manual steering and elevation station 302 shown in FIG. 16. In order to take control of the steering of the forward module 102 from the manual steering and elevation station 302, the variable length strut 146 (shown best in FIG. 10) must be disconnected. This action, in effect, takes the control of the steering of the forward module 102 away from the driver of the forward prime mover 112. Thereafter, auxiliary steering control of the forward module 102 can be assumed by the operator of the manual steering and elevation station 302. This action is useful when it is necessary or desirable to steer the transport vehicle 100 through a narrow space. It should be noted that the transfer of steering control of the forward module 102 to the manual steering and elevation station 302 is a feature in addition to the feature of raising and lowering of the suspension system 138 by the manual steering and elevation station 302 to avoid obstacles encountered on the roadway 248.

Now referring to the self-steering caster suspension system 186, it is specifically utilized for moving ultra heavy payloads 110 carried by the load bearing means 106 as shown in FIGS. 1 and 27. The payload 110 can be in excess of five-hundred thousand pounds and is shown in phantom in FIG. 1. Because of the enormous weight of the payload 110, the self-steering caster suspension system 186 has been designed to assist in carrying the payload 110 so that additional axles 136 do not need to be added to the forward module 102 or the rearward module 104. It is a design objective to enable the multi-axle transport vehicle 100 to transport the maximum payload 110 permitted by law. When the desired payload 110 exceeds the maximum permitted by law, wheel sets 190 designed to caster are inserted underneath the load bearing means 106 to increase the load carrying capacity. Because the added wheel sets 190 are designed to caster, axle steering rods 142 are not required because the caster wheel sets 190 move in the direction of the brute force generated by the movement of the transport vehicle 100.

The self-steering caster suspension system 186 is shown in FIG. 27 and is specifically designed to be utilized with the load bearing means 106 and the transport frame 124 shown in Applicant's FIGS. 28-34. It is very important to note that the self-steering caster suspension system 186 is utilized in conjunction with the hydraulic suspension system 138 as is clearly shown in FIG. 1 for moving ultra-heavy payloads 110. The common goal of employing both the hydraulic suspension system 138 and the caster suspension system 186 is to legally carry the additional weight associated with the ultra-heavy load. To be more precise, the hydraulic suspension system 138 is utilized with the forward module 102 and the rearward module 104 while the self-steering caster suspension system 186 is utilized with the load bearing means 106. Further note that the hydraulic suspension system 138 employs the axle steering rods 142 for steering the axles 136 which are arranged or configured in sets of two as the forward dollies 120 and the rearward dollies 122. In distinction, the caster suspension system 186 as shown in FIGS. 1 and 27 is self-steering and does not utilize any type of axle steering rod device. The brute force generated by the movement of the transport vehicle 100 shown in FIG. 1 pulls the wheel sets 190 of the caster suspension system 186 positioned underneath the load bearing means 106 into the direction of travel of the transport vehicle 100. This caster feature will be discussed further herein below. It is further noted that when the payload 110 is not ultra-heavy, the self-steering caster suspension system 186 might not be employed, that is, Ws use is optional.

The structure of the self-steering caster suspension system 186 is disclosed in Applicant's FIG. 27 and FIG. 27 will be compared here to Applicant's FIGS. 17-18 that are directed to the hydraulic suspension system 138. This comparison will enable the reader to identify the common features of and the distinguishing features between Applicant's caster suspension system 186 and Applicant's hydraulic suspension system 138. Those features common to both the caster suspension system 186 and the hydraulic suspension system 138 will be identified first. It is noted that the front elevation views of the hydraulic suspension system 138 shown, for example, in FIG. 17 and the caster suspension system 186 shown in FIG. 27 are similar. That is to say, the front elevation view of the caster suspension system 186 is very similar to the front elevation view of the hydraulic suspension system 138 shown in FIG. 17. This is the reason why a comparison between FIG. 17 and FIG. 27 is useful in pointing out the common features between the two suspension systems. However, the distinguishing features between the caster suspension system 186 and the hydraulic suspension system 138 are visible in the side elevation views of FIG. 18 and FIG. 27, respectively.

The caster suspension system 186 shown in FIG. 27 and the hydraulic suspension system 138 shown in FIG. 17 both include the structure 168, the first fluid activated cylinder 169 and the second fluid activated cylinder 170, the first spaced apart arm 171 and the second spaced apart arm 172, respectively, for each wheel and axle set. Furthermore, the caster suspension system 186 and the hydraulic suspension system 138 both include the plurality of axles 136, set of wheels 190, and axle linkage member 174. Additionally, the following four perpendicular axes exist in both the caster suspension system 186 and the hydraulic suspension system 138. Those axes include (1) the first axis 240 vertically passing through the center of the structure 168, (2) the second axis 242 parallel to the axle 136 and perpendicular to the first vertical axis 240, (3) the third axis 244 passing through the connection of the first spaced apart arm 171 and the second spaced apart arm 172 extending from the structure 168 with the axle linkage member 174 where the third axis 244 is parallel to the second axis 242, and finally (4) the fourth axis 246 about which the axle 136 is pivotable about, where the fourth axis 246 is perpendicular to the first vertical axis 240, second axis 242 and third axis 244.

There are also four attachment points between the structure 168 and the axle linkage member 174 that are common to both the caster suspension system 186 shown in FIG. 27 and the hydraulic suspension system 138 shown in FIGS. 17 and 18. Those four attachment points include (1) the first fluid activated cylinder 169, (2) the first attachment station 176 of the structure 168 and the third attachment station 178 of the axle linkage member 174, (3) the second attachment station 180 of the structure 168 and the fourth attachment station 182 of the axle linkage member 174, and (4) the second fluid activated cylinder 170. As a result of the four attachment points, the axle linkage member 174 is rigidly locked in place with respect to the structure 168 and will therefore resist the tendency to yaw. As with the hydraulic suspension system 138, the first fluid activated cylinder 169 and second fluid activated cylinder 170, and the first spaced apart arm 171 and second spaced apart arm 172 of the caster suspension system 186, also allow the transport vehicle 100 to be raised and lowered with respect to the roadway 248. The caster suspension system 186 also mechanically stabilizes the plurality of axles 136 with respect to the transport vehicle 100 thereby reducing the axle yaw and allowing for higher speeds of the transport vehicle 100. As the transport vehicle 100 moves, the caster suspension system 186 casters into alignment with the direction of travel of the transport vehicle 100.

A comparison will now be made between FIG. 27 of the caster suspension system 186 and FIG. 18 of the hydraulic suspension system 138 to identify the distinguishing features between the two suspension systems. In FIG. 18 of the hydraulic suspension system 138, the first vertical axis 240 is shown essentially passing through the center of the axle 136. In practice, there is typically some minor displacement or offset of a distance of less than an inch between the first vertical axis 240 and the second axis 242 which is parallel to the axle 136. The reasons for this are the following. In the hydraulic suspension system 138 as shown in FIG. 18, the absence of any slight spacing or offset between the axle 136 and the vertical axis 240 would typically result in the wobbling of the suspension system 138. This wobbling of the suspension system 138 results in instability so that when the transport vehicle 100 is moved, axle yaw and vibration can occur. It is noted that the absence of any "offset" spacing between the axle 136 and the first vertical axis 240 typically results in more wear on the suspension hardware caused by friction generated during the turning of the transport vehicle 100.

Consequently, the hydraulic suspension system 138 shown in FIG. 18 requires a modicum of offset spacing or "slight spacing" to avoid the wobbling effect that can result in axle yaw. It is noted that the "slight spacing" need only be a fraction of an inch to avoid the wobbling effect on the hydraulic suspension system 138. A further reason for the "slight spacing" or "offset" between the axle 136 and the first vertical axis 240 is the following. As the hydraulic suspension system 138 operates as shown in FIGS. 22A, 22B and 22C, the first fluid activated cylinder 169 and second fluid activated cylinder 170, the first spaced apart arm 171 and second spaced apart arm 172, and the axle linkage member 174 constantly change position. This dynamic movement between the extended and retracted positions of the axle linkage member 174 also contributes to the "slight spacing" between the axle 136 and the first vertical axis 240. However, this "slight spacing" is not adequate to cause the caster effect provided by the self-steering caster suspension system 186 of the present invention.

Now comparing the caster suspension system 186 shown as a side elevation view in Applicant's FIG. 27 with the hydraulic suspension system 138 shown in FIG. 18, it is noted that the horizontal portion of the axle linkage member 174 has been lengthened. The purpose of lengthening the horizontal portion of the axle linkage member 174 is to space the second axis 242 and corresponding parallel axle 136 further away from the first vertical axis 240. By spacing the second axis 242 (and parallel axle 136) further away from the first vertical axis 240, it has been determined by experimentation that the caster suspension system 186 will automatically pivot or caster around the first vertical axis 240 when the transport vehicle 100 is moved.

Applicant has determined by experimentation that a separation or an offset distance of from four inches-to-eighteen inches between the second axis 242 (and parallel axle 136) and the first vertical axis 240 is necessary to achieve the caster effect. Further, it has been determined that the optimal caster effect is achieved when the second axis 242 is spaced or offset from the first vertical axis 240 within the range of eight inches-to-nine inches. However, it is emphasized that the second axis 242 (and parallel axle 136) must be spaced or "offset" at least four inches from the first vertical axis 240 in order to achieve the caster effect. The spacing or offset is achieved by lengthening the horizontal portion of the axle linkage member 174. As a result, as the caster suspension system 186 is moved as part of the transport vehicle 100, the caster suspension system 186 will automatically pivot around the first vertical axis 240 until the second axis 242 and the axle 136 are aligned with the direction of travel. In other words, the second axis 242 is spaced from the first vertical axis 240 by an amount sufficient to cause the second axis 242 and the axle 136 of the caster suspension system 186 to caster or pivot about or around the first vertical axis 240 and move into alignment with the direction of travel of the transport vehicle 100 when the transport vehicle 100 is moved. This inventive feature is the direct result of the lengthening of the horizontal portion of axle linkage member 174 to position the second axis 242 further away from the first vertical axis 240. Under these conditions, the axle 136 will always be substantially perpendicular to the direction of travel which reduces the yaw of axle 136.

It was previously noted that the hydraulic suspension system 138 as shown in FIG. 18 typically exhibits some "slight spacing" of less than an inch between the axle 136 and the first vertical axis 240. It was explained that the absence of any spacing or offset typically results in the wobbling of the hydraulic suspension system 138 so that when the transport vehicle 100 is moved, axle yaw and vibration can occur. The "slight spacing" that typically exists between the axle 136 and the first vertical axis 240 is adequate to suppress the wobbling in the wheel sets 190 of the hydraulic suspension system 138 as long as the axle steering rods 142 remain connected in a closed loop. It is emphasized that the wheel sets 190 of the caster suspension system 186 do not utilize interconnected axle steering rods 142 controlled by a hydraulic system.

However, if (1) the side axle steering rods 142 were removed from the hydraulic suspension system 138, and (2) the wheel set 190 of the hydraulic suspension system 138 was used as a caster wheel set with the "slight spacing" of less than an inch, and (3) a turn of the transport vehicle 100 was initiated with the wheel set 190, the hydraulic suspension system 138 would not caster and would not follow the direction of travel of the transport vehicle 100. If this action was attempted, it would likely result in physical damage to the hydraulic suspension system 138 because the second axis 242 is not sufficiently offset a minimum of four inches from the first vertical axis 240 to cause the axle 136 and second axis 242 to caster around the first vertical axis 240. It is further noted that the loop connected, axle steering rods 142 utilized with the wheel sets 190 of the hydraulic suspension system 138 are totally inconsistent with the wheel sets 190 utilized with the caster suspension system 186 of the present invention. This is the case since the wheel sets 190 of the caster suspension system 186 are self-steering and controlled by the force generated by the movement of the transport vehicle 100 shown in FIG. 1. Furthermore, if an attempt was made to utilize the hydraulic suspension system 138 as a caster suspension system without disconnecting the axle steering rods 142, the axle steering rods 142 would resist the caster effect during a turning maneuver and result in damage to or breakage of the axle steering rods 142.

In distinction, the brute force generated by the movement of the transport vehicle 100 pulls the wheel sets 190 of the caster suspension system 186 positioned underneath the load bearing means 106 into the direction of travel. The caster suspension system 186 does not utilize loop connected, axle steering rods 142. It is the "offset" spacing of a sufficient amount between the second axis 242 (and parallel axle 136) and the first vertical axis 240 that enables the wheel sets 190 to caster. If the force generated by the movement of the transport vehicle 100 is directed in a leftward direction, the caster suspension system 186 moves in a leftward direction. Likewise, if the force generated by the movement of the transport vehicle 100 is directed in a rightward direction, the caster suspension system 186 moves in a rightward direction. It is noted that the forces applied to the forward module 102, rearward module 104 and the load bearing means 106 are both a function of time {f(t)} and a function of the road conditions. Consequently, an advantage of the present invention is that the caster wheel sets 190 are very versatile and can be utilized as needed at any desired location underneath the transport vehicle 100.

It has been emphasized that the purpose of lengthening the horizontal portion of the axle linkage member 174 is to space the second axis 242 (and parallel axle 136) by a sufficient amount further away from the first vertical axis 240. The lengthened space between the second axis 242 and the first vertical axis 240 is the required "offset" spacing within the range of 4"-to-18" that enables the caster suspension system 186 to automatically pivot or caster (that is, self-steer) around the first vertical axis 240 when the transport vehicle 100 is moved. When this "offset" spacing exists, the first vertical axis 240 does not pass through the center of axle 136 but is "offset" by a sufficient amount, e.g., by at least 4" from the second axis 242 (which is parallel to the axle 136) as shown in FIG. 27. This minimum 4" offset exists regardless of the position of the first fluid activated cylinder 169 and second fluid activated cylinder 170, first spaced apart arm 171 and second spaced apart arm 172, and the axle linkage member 174 (i.e., whether the caster suspension system 186 is vertically extended or contracted). Consequently, the structure 168 (and the associated mechanical bearing, not shown) of the forward dollies 120*a*, 120*b*, 120*c* and rearward dollies 122*a*, 122*b*, 122*c* of the caster suspension system 186, through which the first vertical axis 240 passes, is also "offset" from the second axis 242. These conditions are illustrated in Applicant's pending FIG. 27.

This situation is compared to the hydraulic suspension system 138 illustrated in FIG. 17 in which the structure 168 (and associated mechanical bearing) is essentially positioned directly over the second axis 242 (and parallel axle 136). Notwithstanding the "offset" spacing exhibited by the caster suspension system 186, the axle spacing measured from the axle center of the front axle 157 at the forward portion of, for example, dolly 120a (best shown in FIG. 3) to the axle center of the front axle 157 at the rearward portion of dolly 120a of the same wheel set 190 continues to be 9' 0" (see length $L_1$ in FIG. 36). Likewise, the length dimension of each axle 157 measured between the outer wheels 190 is 7' 0" (see length $L_2$ in FIG. 36). By maintaining these axle dimensions, the transport vehicle 100 will meet the jurisdictional regulation to carry the maximum "on-road" weight load permitted by law and also to satisfy the regulations directed to safe bridge crossings.

In summary, the essence of the self-steering, caster suspension system 186 is as follows. The structure 168 of the caster suspension system 186 is pivotable about the first vertical axis 240 where the structure 168 includes a first attachment station 176 spaced apart from the second attachment station 180. The axle 136 is disposable along the second axis 242 which is perpendicular to the first vertical axis 240. Further, the second axis 242 is spaced from the first vertical axis 240 by an amount sufficient to cause the axle 136 and the second axis 242 to caster about the first vertical axis 240 and to move into alignment with the direction of travel of the transport vehicle 100 when the transport vehicle 100 is moved. The axle linkage member 174 includes the third attachment station 178 spaced apart from the fourth attachment station 182. The third attachment station 178 of the axle linkage member 174 is pivotally connected to the first attachment station 176 of the structure 168 while the fourth attachment station 182 of the axle linkage member 174 is pivotally connected to the second attachment station 180 of the structure 168. Additionally, the axle linkage member 174 is pivotable about the third axis 244 which is parallel to the second axis 242. Finally, the axle 136 is pivotally connected to the axle linkage member 174 and the axle 136 is pivotable about the fourth axis 246 where the fourth axis 246 is perpendicular to the first vertical axis 240, second axis 242 and the third axis 244.

We now turn our attention to the load bearing means 106 clearly shown in FIG. 1. The load bearing means 106 is integrated between the forward module 102 and the rearward module 104 in a unitary constructed manner and is comprised of the transport frame 124 which includes the pair of transport carrying beams 126 and 128 shown in FIGS. 30 and 31. Although the first single central spine 130 of the forward module 102 and the second single central spine 132 of the rearward module 104 are also utilized for carrying a physical load, the transport frame 124 is utilized to carry high profile payloads 110. An example of a high profile payload 110 is a large electrical transformer weighing in excess of five-hundred thousand pounds and used in a switching substation of an electrical utility company. Although the following description is directed to the load bearing means 106 that employs the transport frame 124, it should be understood that other means for carrying the payload 110 can be utilized such as, for example, a flatbed trailer (not shown).

Figure 30:
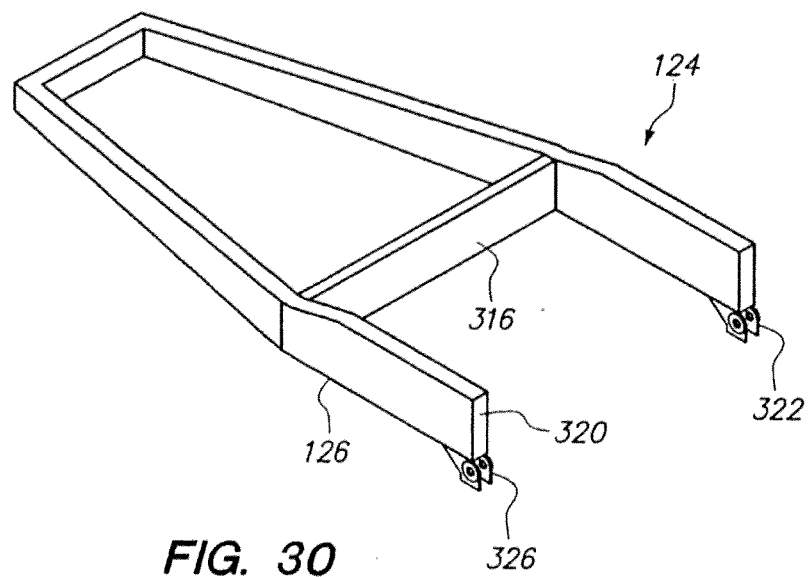
FIG. 30 is a perspective view of a forward section of the transport frame of the transport vehicle of FIG. 1 showing the pair of the transport carrying beams.
Figure 31:
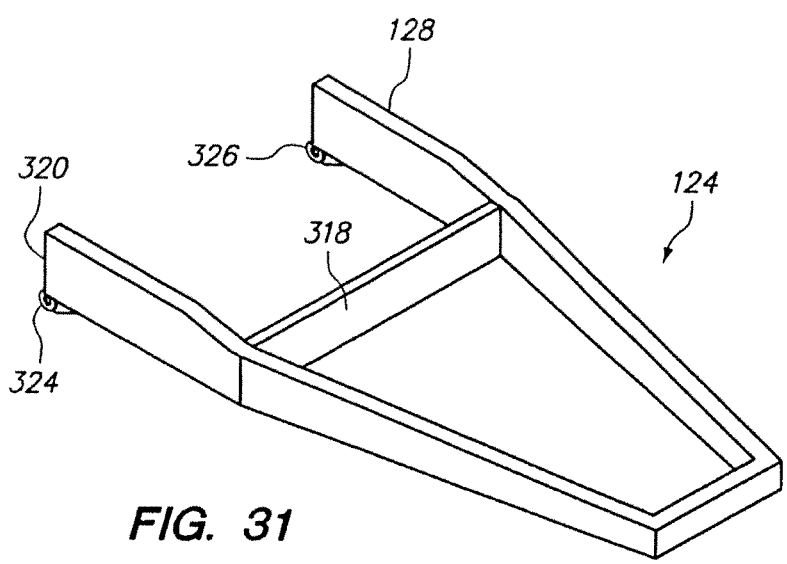
FIG. 31 is a perspective view of a rearward section of the transport frame of the transport vehicle of FIG. 1 showing the pair of the transport carrying beams.

Referring to FIGS. 1, 30, 31 and 32, the structure of the load bearing means 106 will now be described. In the embodiment presented, the transport frame 124 serves to capture and carry the payload 110. This aspect is accomplished by utilizing the pair of transport carrying beams including the forward carrying beam 126 and the rearward carrying beam 128. The forward carry beam 126 and the rearward carrying beam 128 are, in general, two separate components but are essentially mirror images of one another. Both include a reinforcing cross arm, that is, the forward carrying beam 126 includes a reinforcing cross arm 316 while the rearward carrying beam 128 includes a reinforcing cross arm 318 as shown in FIGS. 30 and 31. As can be seen from FIG. 1, the forward carrying beam 126 and the rearward carrying beam 128 are combined to form the transport frame 124. Consequently, the forward carrying beam 126 and rearward carrying beam 128 separate at an interface 320 shown in FIGS. 1 and 32 to facilitate their separation and combination. In order to secure these two components to the interface 320, each includes a pair of connection brackets. The forward carrying beam 126 includes a pair of male connection brackets 322 and the rearward carrying beam 128 includes a corresponding pair of female connection brackets 324. Each of the male connection brackets 322 and female connection brackets 324 include corresponding apertures 326 for receipt of suitable removable locking hardware such as, for example, steel pins or pinch bolts (not shown).

Figure 32:
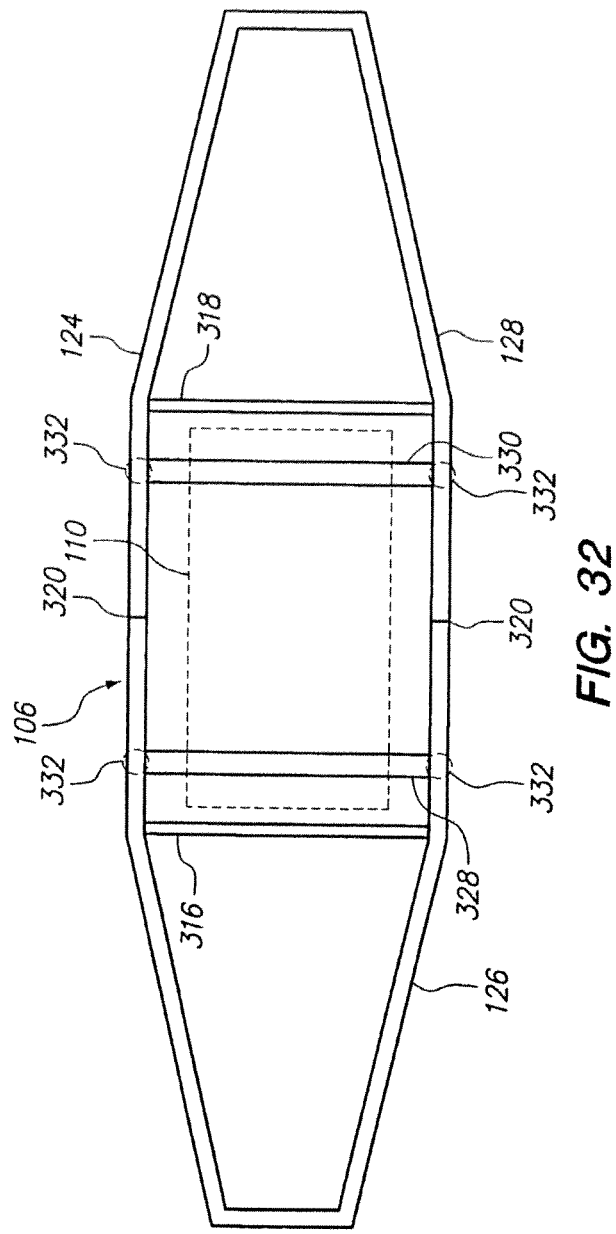
FIG. 32 is a top plan view of the transport frame of FIG. 1 showing a pair of support beams for supporting a payload, a plurality of cylindrical stanchions for positioning the transport carrying beams to support the weight of the payload, and the separation point of the pair of transport carrying beams.

Reference is now made to the top plan view of the load bearing means 106 shown in FIG. 32. The load bearing means 106 includes the transport frame 124 comprised of the forward carrying beam 126 with the associated reinforcing cross arm 316 and the rearward carrying beam 128 with the associated reinforcing cross arm 318. The point of intersection, that is the interface 320, between the forward carrying beam 126 and the rearward carrying beam 128 is clearly shown. Positioned underneath the payload 110 (shown in phantom) is a pair of lower support beams 328 and 330 which function as a carrying platform onto which the payload 110 is placed, typically with the assistance of a crane. In the plan view of FIG. 32, the lower support beam 328 is in-board of the cross arm 316 of the forward carrying beam 126. Likewise, the lower support beam 330 is in-board of the cross arm 318 of the rearward carrying beam 128. Finally, positioned between the lower support beams 328 and 330 and the forward carrying beam 126 and the rearward carrying beam 128 is a plurality of four cylindrical support stanchions 332. One of the support stanchions 332 positioned between the lower support beam 328 and the forward carrying beam 126 is more clearly shown in FIG. 29. The function of the support stanchions 332 is to act as spacers between the lower support beams 328 and 330 and the forward carrying beam 126 and the rearward carrying beam 128.

Figure 29:
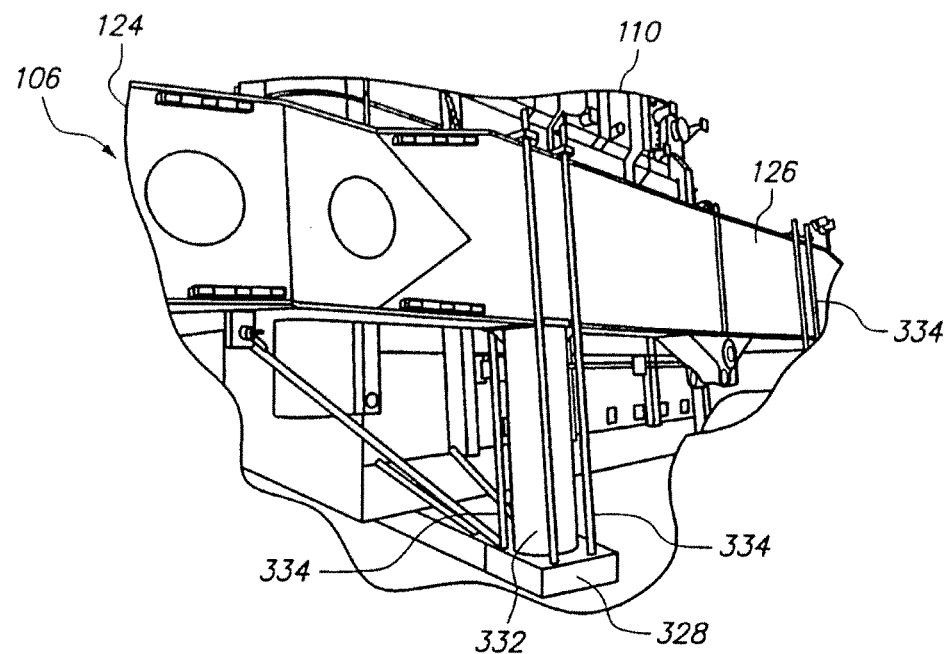
FIG. 29 is another partial perspective view of the transport frame of FIG. 1 showing cylindrical support stanchions, support beams and suspension rods used in securing a payload to the transport carrying beams.

Connected between each of the lower support beams 328 and 330 and the forward carrying beam 126 and the rearward carrying beam 128 is a plurality of sixteen vertical support rods 334 shown best in FIGS. 1 and 29. Thus, between the lower support beam 328 and the forward carrying beam 126, there are four vertical support rods 334 surrounding each of the two support stanchions 332, i.e., a total of eight vertical support rods 334. Likewise, between the lower support beam 330 and the rearward carrying beam 128, there are four vertical support rods 334 surrounding each of the two support stanchions 332, i.e., another total of eight vertical support rods 334. Each of the vertical support rods 334 is threaded and serves to connect the lower support beam 328 to the forward carrying beam 126, and also to connect the lower support beam 330 to the rearward carrying beam 128. The length of the sixteen vertical support rods 334 and the height of the support stanchions 332 are a function of the height of the payload 110. By employing the threaded vertical support rods 334 between the lower support beams 328 and 330, and the forward carrying beam 126 and the rearward carrying beam 128, the weight of the transported payload 110 can be transferred from the lower support beams 328 and 330 to the forward carrying beam 126 and the rearward carrying beam 128 of the transport frame 124. Thus, the payload 110 is suspended onto the sixteen vertical support rods 334 to transfer the weight from the lower support beams 328 and 330 to the forward carrying beam 126 and rearward carrying beam 128, respectively. This is the method utilized in the disclosed embodiment by which the weight of the transported payload 110 is transferred to the transport frame 124.

The load bearing means 106 is integrated between the forward module 102 and the rearward module 104 of the multi-axle transport vehicle 100 in a unitary constructed manner. This integration is such that each of the forward module 102, rearward module 104 and the load bearing means 106 is designed to form a single trailer unit. Typically, the transport frame 124 of the present invention is to suspended between the forward module 102 and the rearward module 104 and supported by a pair of turn tables including a forward turn table 336 shown in FIGS. 1, 12 and 13 and a rearward turn table 338 shown in FIGS. 1 and 33. The forward turn table 336 is removably mounted on the first single central spine 130 of the forward module 102 while the rearward turn table 338 is removably mounted on the second single central spine 132 of the rearward module 104. Each of the forward turn table 336 and rearward turn table 338 include a bearing for point loading and steering control of the payload 110 mounted on the first single central spine 130 and second single central spine 132, respectively.

The bearing associated with the forward turn table 336 provides a three-way pivot 340 as shown in FIGS. 12 and 13 for facilitating the turning and twisting associated with a turning maneuver. During such a maneuver, the load bearing means 106 must turn and follow the forward module 102 when the forward prime mover 112 initiates a turn as show in FIG. 5. Likewise, the control bearing of the rearward turn table 338 is positioned on the rearward module 104 and is connected to the rearward carrying beam 128 at two connection points 342 as shown in FIG. 33. This dual connection ensures that the rearward carrying beam 128 of the transport frame 124 is securely connected to the second single central spine 132 via the rearward turn table 338. The control bearings of the forward turn table 336 and the rearward turn table 338 are employed for point loading of the transport body 108. That is, the massive weight of the payload 110 is distributed across the first single central spine 130 of the forward module 102 via the forward turn table 336 and across the second single central spine 132 of the rearward module 104 via the rearward turn table 338, respectively. Consequently, the rearward module 104 can be steered by the steering wheel 164 located within the steering cab 166 shown in FIGS. 1 and 33 during turning maneuvers. It is emphasized that the payload 110 is typically suspended between the forward turn table 336 and the rearward turn table 338 and that there typically are no dollies located underneath the load bearing means 106. However, when the payload 110 is excessively heavy, the separate and independent caster suspension system 186 previously disclosed herein in FIG. 27 is employed in addition to the hydraulic suspension system 138 as shown in FIG. 1.

Figure 34:
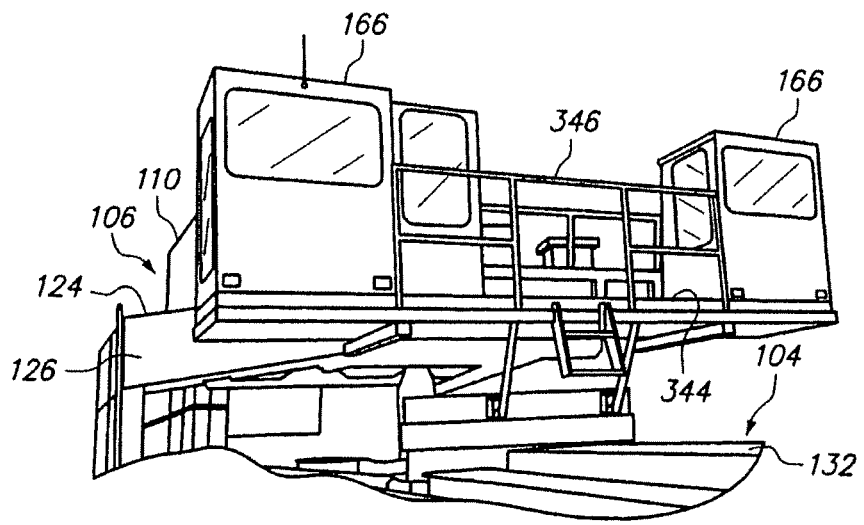
FIG. 34 is a rear perspective view of twin steering cabs mounted on the rearward main turn table of the transport vehicle of FIG. 1 for controlling and steering the rearward module.

The rear steering cab 166 is shown in FIGS. 1, 33 and 34 and is employed to enable a rear driver (not shown) to steer the rearward module 104. In the forward module 102, movement of the draw bar 114 in combination with the variable length strut 146 and the power steering valve 148 automatically controls which of the pairs of hydraulic cylinders 150 receives the hydraulic fluid. In the rearward module 104, the automatic steering feature is replaced with a driver (not shown) who occupies the rear steering cab 166 to control and steer the rearward module 104. Instead of using a draw bar as in the forward module 102, the steering wheel 164 located in the rear steering cab 166 positioned on the back end of the rearward module 104 as shown in FIG. 33 is utilized to control the set of wheels 190 and axles 136 comprising the rearward dollies 122a, 122b, 122c shown in FIG. 1. The driver manually operates the steering wheel 164 utilized to control the hydraulic fluid directed to the front hydraulic cylinders 150 of the plurality of rearward dollies 122a, 122b, 122c. Manual operation of the steering wheel 164 in the rear steering cab 166 controls the direction of the wheel sets 190 of the rearward dollies 122 in the rearward module 104. Thus, the rear steering cab 166 is employed to control and steer the rearward module 104. It is noted that the steering control of the rearward module 104 is independent of the steering control of the forward module 102. A rear view of the rear steering cab 166 is shown in FIG. 34 and includes dual compartments connected by a walkway 344 bounded by a handrail 346.

Now referring again to FIG. 32, the procedure for removing the payload 110 from the load bearing means 106 of the transport vehicle 100 will be described. The payload 110 (shown in phantom) is supported on the lower support beams 328 and 330. In the preferred embodiment disclosed, the payload 110 is ultra heavy and thus self-steering wheels sets 190 of the caster suspension system 186 are positioned underneath the lower support beams 328 and 330 as shown in FIG. 1. In distinction, FIG. 29 shows the payload 110 seated on the lower support beam 328 but wheels sets 190 of the caster suspension system 186 are not shown. In either situation, the procedure is similar in that the wheels sets 190 of the caster suspension system 186 may remain in place or, in the alternative, are removed. If the caster wheel sets 190 are removed, the payload 110 continues to be supported by the forward carrying beam 126 and the rearward carrying beam 128. Further, the caster wheel sets 190 are removed, the two lower support beams 328 and 330 are then positioned onto support blocks (not shown). Thereafter, the sixteen threaded vertical support rods 334 are removed so that the weight of the payload 110 is resting on the lower support beams 328 and 330. The existing cylindrical support stanchions 332 remain in position between (1) the lower support beam 328 and the forward carrying beam 126, and (2) the lower support beam 330 and the rearward carrying beam 128 as shown in FIG. 32. Thereafter, the pinch bolts (not shown) that hold the forward carrying beam 126 to the rearward carrying beam 128 are removed.

Next, the control handles 310 of the hydraulic control station 302 shown in FIG. 16 are operated so that both the forward module 102 and the rearward module 104 are raised an equivalent amount. This causes the entire transport frame 124 to be raised. Next, a set of connection pins (not shown) located at the bottom of the forward carrying beam 126 and the rearward carrying beam 128 are removed with a sledge hammer. The elevated forward carrying beam 126 and rearward carrying beam 128 are now disconnected and can be separated. Separation occurs by pulling the forward carrying beam 126 with the forward prime mover 112 away from the rearward carrying beam 128 which can be pulled in the opposite direction with the rearward prime movers 116. After, the forward carrying beam 126 is separated from the rearward carrying beam 128, the payload 110 remains positioned on the lower support beams 328 and 330. Next, separate bearing rollers (not shown) are positioned underneath the payload 110 by preferably hydraulically jacking-up the payload 110 (as known in the art) that the payload 110 can be rolled away to a predetermined destination.

Once the payload 110 has been removed, the forward carrying beam 126 and the rearward carrying beam 128 are driven back together and reunited by reinstalling the connection pins. Thereafter, the hydraulic control station 302 is operated so that the forward module 102 and the rearward module 104 are lowered to their original positions. The pinch bolts (not shown) which hold the forward carrying beam 126 and the rearward carrying beam 128 together are reinstalled. The sixteen vertical support rods 334 are reinstalled so that the weight of the lower support beams 328 and 330 is transferred to the forward carrying beam 126 and the rearward carrying beam 128. By utilizing the threads formed on the sixteen vertical support rods 334 or by hydraulically raising the forward module 102 and the rearward module 104, the blocks originally positioned underneath the lower support beams 328 and 330 can be removed. The wheel sets 190 of the caster suspension system 186 can then be reinstalled, if desired. The transport vehicle 100 is now in condition to be driven back to the truck yard and parked until utilized again. It is emphasized that the transport vehicle 100 need not be disassembled during the excursion between a work site and the truck yard or between a first work site and a second work site. Not disassembling the transport vehicle 100 on return trips from work sites is more time efficient and cost efficient.

Figure 35:
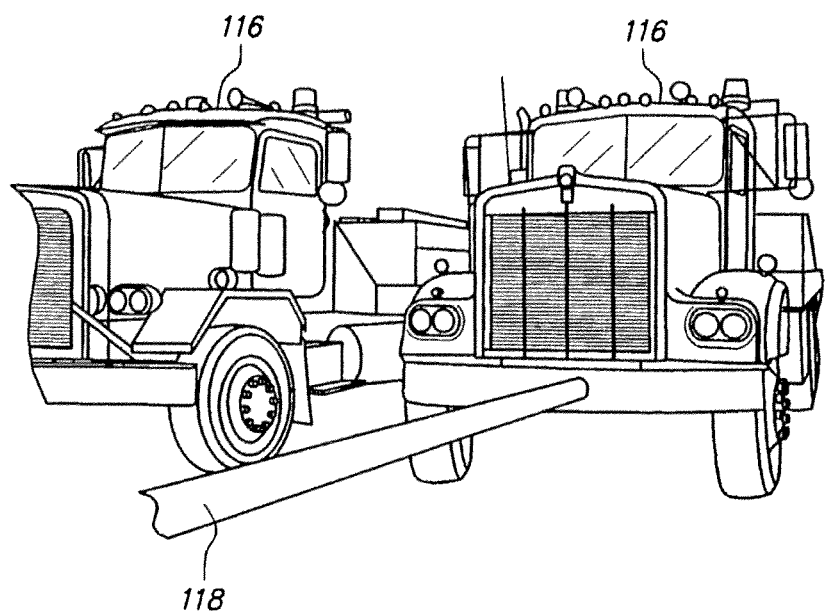
FIG. 35 is a perspective view of the rearward prime movers including driver push rods employed to drive the transport vehicle of FIG. 1.

Finally, the rearward prime movers 116 are typically comprised of a pair of trucks or tractors which are utilized to urge the transport vehicle 100 forward as is clearly shown in FIGS. 1 and 35. This is accomplished by utilizing a pair of driver push rods 118 that extend from the front of the rearward prime movers 116 to the back side of the rearward module 104. Force applied by the rearward prime movers 116 to the back side of the rearward module 104 via the driver push rods 118 facilitates forward movement of the transport vehicle 100. The pushing force associated with the driver push rods 118 in combination with the pulling force of the draw bar 114 serve to initiate forward movement of the multi-axle transport vehicle 100. Likewise, the rearward prime movers 116 acting in concert with the forward prime mover 112 as shown in FIG. 1 can serve to initiate movement of the transport vehicle 100 in the reverse direction.

The present invention is generally directed to a dual lane, multi-axle transport vehicle 100 for use in moving heavy loads including a forward module 102 mounted on a plurality of axles 136 and a rearward module 104 also mounted on a plurality of axles 136. The axles 136 are arranged or configured in sets of two as forward dollies 120 and rearward dollies 122. The forward module 102 is mechanically connected to the rearward module 104 for providing a high speed, dual lane transport body 108. The forward module 102 and the rearward module 104 of the transport body 108 each have a single central spine 130 and 132, respectively, wherein each of the forward dollies 120 and rearward dollies 122 are respectively attached to the corresponding single central spine 130, 132. The forward dollies 120 and the rearward dollies 122 which are comprised of the axles 136 in sets of two have an axle spacing of at least six feet. A hydraulic suspension 138 is provided for dynamically stabilizing the axles 136 for reducing axle yaw. An axle steering system 140 having a plurality of axle steering rods 142 controls the position of the axles 136 comprising the forward dollies 120 and rearward dollies 122.

The present invention provides novel advantages and structural features over other multi-axle vehicles designed to transport heavy loads. Initially, (1) the present invention is a dual lane multi-axle transport vehicle 100 that includes parallel sets of axles 136 per dolly, (2) is capable of traveling at 35 miles per hour "on-road" over public roadways while carrying a full payload 110, (3) comprises "dual lane" construction which occupies two adjacent roadway lanes and exhibits a width dimension of preferably 18'-to-20', (4) designed to incorporate unitary construction between the forward module 102, rearward module 104 and the load bearing means 106 as a single trailer unit, (5) is capable of moving in both forward and reverse directions, and (6) is typically fabricated from lightweight steel. Further, the transport vehicle 100 of the present invention preferably incorporates (7) a single central spine construction having a first single central spine 130 in the forward module 102 and a second single central spine 132 in the rearward module 104, (8) an axle separation of 9'0" and an axle length of 7'0" for legally carrying maximum on-road weight limits, (9) an automatic power steering system 144 for quickly controlling the direction of the axles 136 of the front wheel sets 190 forming the forward dollies 120 and rearward dollies 122, (10) an all-axle steering system 140 including side steering rods 142 for controlling the position of the axles 136, (11) a hydraulic suspension system 138 having dual arms 171, 172 in combination with dual fluid activated cylinders 169, 170 for dynamically stabilizing the axles 136 and resisting axle yaw, (12) front and rear turn tables 336, 338 mounted on the forward module 102 and rearward module 104, respectively, to provide point loading and steering control, and (13) a rear steering cab 166 for controlling and steering the rear axles 162 of the rearward module 104. Finally, the transport vehicle 100 can include (14) detachable connectors 134 for disassembling each of the forward dollies 120 and rearward dollies 122 from the corresponding single central spine 130, 132, respectively, while (15) disassembly of the dollies 120, 122 from the single central spines 130, 132 is not required for moving the transport vehicle 100 to another location, and (16) a self-steering caster suspension system for providing additional suspension support for ultra-heavy payloads 110.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention.

What is claimed is:

1. A dual lane multi-axle transport vehicle comprising:
a module mounted on a plurality of axles wherein longitudinally adjacent ones of said axles that are located on the left side of the module are spaced apart from each other in a longitudinal direction, as are longitudinally adjacent ones of said axles that are located on the right side of the module, wherein laterally adjacent ones of said axles being one on the left side of the module and one on the right side are positioned side by side and are spaced apart from each other in a lateral direction so as to provide a dual lane transport body that is wide enough to occupy two lanes of a highway,
the module having a beam running longitudinally wherein said axles are each situated relative to said beam such that the beam is located inward from the innermost wheels that would be mounted to laterally adjacent axles, a plurality of arms laterally extending from said beam, said axles being coupled to the beam through a single one of said arms, a hydraulic suspension for stabilizing said axles, and an axle steering system for controlling the position of said axles.

2. The dual lane multi-axle transport vehicle of claim 1, wherein the axle steering system enables a) at least one pair of laterally adjacent front axles, located in a front half of the module and b) at least one pair of laterally adjacent rear axles, located in a rear half of the module, to rotate in opposite directions when the module is turning.

3. The dual lane multi-axle transport vehicle of claim 1 further comprising:
   a gooseneck and bed structure; and
   a further module mounted on a plurality of axles wherein longitudinally adjacent ones of said axles that are located on the left side of the further module are spaced apart from each other in a longitudinal direction, as are longitudinally adjacent ones of said axles that are located on the right side of the further module, wherein laterally adjacent ones of said axles being one on the left side of the further module and one on the right side are positioned side by side and are spaced apart from each other in a lateral direction so as to provide a dual lane transport body that is wide enough to occupy two lanes of a highway, the further module having a beam running longitudinally wherein said axles are each situated relative to said beam such that the beam is located inward from the innermost wheels that would be mounted to laterally adjacent axles, a plurality of arms laterally extending from said beam, said axles being coupled to the beam through said arms, a hydraulic suspension for stabilizing said axles, and an axle steering system for controlling the position of said axles,
   and wherein the gooseneck and bed structure connects the further module to said module.

4. The dual lane multi-axle transport vehicle of claim 1 wherein longitudinally adjacent ones of the axles of said module have an axle spacing of about nine feet.

5. The dual lane multi-axle transport vehicle of claim 1, further comprising:
   a draw bar coupled to the module and to a prime mover, wherein when the prime mover moves along the middle of two adjacent highway lanes the axles located on the left side of the module move in the left lane and the axles located on the right side of the module move in the right lane.

6. The dual lane multi-axle transport vehicle of claim 5 further comprising:
   a gooseneck and bed structure; and
   a further module mounted on a plurality of axles wherein longitudinally adjacent ones of said axles that are located on the left side of the further module are spaced apart from each other in a longitudinal direction, as are longitudinally adjacent ones of said axles that are located on the right side of the further module, wherein laterally adjacent ones of said axles being one on the left side of the further module and one on the right side are positioned side by side and are spaced apart from each other in a lateral direction so as to provide a dual lane transport body that is wide enough to occupy two lanes of a highway, the further module having a beam running longitudinally wherein said axles are each situated relative to said beam such that the beam is located inward from the innermost wheels that would be mounted to laterally adjacent axles, a plurality of aims laterally extending from said beam, said axles being coupled to the beam through said arms, a hydraulic suspension for stabilizing said axles, and an axle steering system for controlling the position of said axles,
   and wherein the gooseneck and bed structure connects the further module to said module.

7. The dual lane multi-axle transport vehicle of claim 1 further comprising a further module that is connected to said module,
   wherein the further module is mounted on a plurality of axles wherein longitudinally adjacent ones of said axles that are located on the left side of the further module are spaced apart from each other in a longitudinal direction, as are longitudinally adjacent ones of said axles that are located on the right side of the further module, wherein laterally adjacent ones of said axles being one on the left side of the further module and one on the right side are positioned side by side and are spaced apart from each other in a lateral direction so as to provide a dual lane transport body that is wide enough to occupy two lanes of a highway, the further module having a beam running longitudinally wherein said axles are each situated relative to said beam such that the beam is located inward from the innermost wheels that would be mounted to laterally adjacent axles, a plurality of arms laterally extending from said beam, said axles being coupled to the beam through said arms, a hydraulic suspension for stabilizing said axles, and an axle steering system for controlling the position of said axles.

8. The dual lane multi-axle transport vehicle of claim 1, wherein said axle steering system comprises a left steering linkage that links the longitudinally adjacent ones of said axles that are located on the left side of the module, and a right steering linkage that links the longitudinally adjacent ones of said axles that are located on the right side of the module.

9. A dual lane multi-axle transport vehicle comprising:
   a module mounted on a plurality of axles wherein longitudinally adjacent ones of said axles that are located on the left side of the module are spaced apart from each other in a longitudinal direction, as are longitudinally adjacent ones of said axles that are located on the right side of the module, wherein laterally adjacent ones of said axles being one on the left side of the module and one on the right side are positioned side by side and are spaced apart from each other in a lateral direction so as to provide a dual lane transport body that is wide enough to occupy two lanes of a highway, and
   the module having a beam running longitudinally wherein said axles are each situated relative to said beam such that the beam is located inward from the innermost wheels that would be mounted to laterally adjacent axles, a hydraulic suspension for stabilizing said axles, and an axle steering system for controlling the position of said axles.

10. The dual lane multi-axle transport vehicle of claim 9, wherein longitudinally adjacent ones of the axles of said module have an axle spacing of about nine feet.

11. The dual lane multi-axle transport vehicle of claim 9, wherein said module has a plurality of aims laterally extending from said beam, each of said axles being coupled to the beam through a single one of said arms.

12. A dual lane, multi-axle transport vehicle comprising:
   a forward module mounted on a plurality of axles wherein longitudinally adjacent ones of said axles that are located on the left side of the module are spaced apart from each other in a longitudinal direction, as are longitudinally adjacent ones of said axles that are located on the right side of the module, and wherein laterally adjacent ones of said axles being one on the left side of the module and one on the right side are positioned side by side and are spaced apart from each other in a lateral direction so as to provide a dual lane transport body that is wide enough to occupy two lanes of a highway;
   a rearward module connected to the forward module and mounted on a plurality of axles wherein longitudinally adjacent ones of said axles that are located on the left side of the rearward module are spaced apart from each other in a longitudinal direction, as are longitudinally adjacent ones of said axles that are located on the right side of the rearward module, and wherein laterally adjacent ones of said axles being one on the left side of the rearward module and one on the right side are positioned side by side and are spaced apart from each other in a lateral direction to provide a dual lane transport body that is wide enough to occupy two lanes of a highway;

said forward module and said rearward module each having a respective beam running longitudinally wherein said axles of said forward module and said axles of said rearward module are each situated relative to said respective beam such that the respective beam is located inward from the innermost wheels that are mounted to laterally adjacent axles of the module;

a suspension system coupled to said axles of the forward module and said axles of the rearward module; and a power steering system for controlling the position of said axles of said forward module and said axles of said rearward module.

13. The multi-axle transport vehicle of claim 12 further comprising a tractor coupled to the forward module, wherein the tractor is to move in the middle of two adjacent highway lanes while the axles located on the left side of the modules move in the left lane and the axles located on the right side of the modules move in the right lane.

14. The multi-axle transport vehicle of claim 12 wherein said longitudinally adjacent axles of said forward module and said longitudinally adjacent axles of said rearward module each have an axle spacing of about nine feet.

15. The multi-axle transport vehicle of claim 12 wherein said dual lane transport body is about nineteen feet in width.

16. The multi-axle transport vehicle of claim 12 wherein the forward and rearward modules as connected can travel on a highway at thirty-five miles per hour.

17. A dual lane, multi-axle transport vehicle comprising:

a forward module mounted on a plurality of axles wherein adjacent ones of said axles that are located on the left side of the module are spaced apart from each other in a longitudinal direction, as are adjacent ones of said axles that are located on the right side of the module, and wherein laterally adjacent ones of said axles being one on the left side of the module and one on the right side are positioned side by side and are spaced apart from each other in a lateral direction so as to provide a dual lane transport body that is wide enough to occupy two lanes of a highway;

a rearward module connected to the forward module and being mounted on a plurality of axles wherein adjacent ones of said axles that are located on the left side of the module are spaced apart from each other in a longitudinal direction, as are adjacent ones of said axles that are located on the right side of the module, and wherein laterally adjacent ones of said axles being one on the left side of the module and one on the right side are positioned side by side and are spaced apart from each other in a lateral direction so as to provide a dual lane transport body that is wide enough to occupy two lanes of a highway;

said forward module being connected to said rearward module, said forward module and said reward module each having a) a center beam, b) a plurality of arms connected to the center beam while spaced apart from each other longitudinally along the center beam, and extending laterally outward from the center beam to couple with the axles of the module, and c) a suspension system for said axles of the module; and a power steering system coupled to said axles of said forward module and said axles of said rearward module.

18. The multi-axle transport vehicle of claim 17 further comprising a plurality of axle beams, wherein each axle beam is connected to a respective one of the arms, and wherein each axle beam has attached to it two of said axles to form a dolly and in a manner that allows the two axles to be steered.

19. The multi-axle transport vehicle of claim 18 wherein each of the arms comprises a plate and a pin, wherein the pin joins the plate to an axle beam of the dolly.

20. A dual lane, multi-axle transport vehicle comprising:

a forward module mounted on a plurality of axles wherein longitudinally adjacent ones of said axles that are located on the left side of the module are spaced apart from each other in a longitudinal direction, as are longitudinally adjacent ones of said axles that are located on the right side of the module, and wherein laterally adjacent ones of said axles being one on the left side of the module and one on the right side are positioned side by side and are spaced apart from each other in a lateral direction so as to provide a dual lane transport body that is wide enough to occupy two lanes of a highway;

a rearward module connected to the forward module and being mounted on a plurality of axles wherein longitudinally adjacent ones of said axles that are located on the left side of the module are spaced apart from each other in a longitudinal direction, as are longitudinally adjacent ones of said axles that are located on the right side of the module, and wherein laterally adjacent ones of said axles being one on the left side of the module and one on the right side are positioned side by side and are spaced apart from each other in a lateral direction so as to provide a dual lane transport body that is wide enough to occupy two lanes of a highway;

a suspension comprising an articulated arm having an upper portion attached to an upper portion of a fluid activated cylinder, and a lower portion attached to an axle linkage member and to a lower portion of the cylinder; and an axle steering system having a plurality of steering rods for controlling the position of said axles of said forward module and said axles of said rearward module.

21. The multi-axle transport vehicle of claim 20 wherein the suspension comprises:

a further articulated arm; and a further fluid activated cylinder, wherein an upper portion of the further arm is attached to an upper portion of the further cylinder, and a lower portion of the further arm is attached to an axle linkage member and to a lower portion of the further cylinder.

* * * * *